United States Patent
Aratani et al.

(10) Patent No.: US 12,441,883 B2
(45) Date of Patent: Oct. 14, 2025

(54) CONTINUOUS FIBER REINFORCED RESIN COMPOSITE MATERIAL AND METHOD OF PRODUCING SAME, AND CONTINUOUS FIBER REINFORCED RESIN MOLDED ARTICLE

(71) Applicant: ASAHI KASEI KABUSHIKI KAISHA, Tokyo (JP)

(72) Inventors: Yusuke Aratani, Tokyo (JP); Tsutomu Akiyama, Tokyo (JP); Toru Koizumi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 570 days.

(21) Appl. No.: 17/907,405

(22) PCT Filed: Mar. 16, 2021

(86) PCT No.: PCT/JP2021/010660
§ 371 (c)(1),
(2) Date: Sep. 27, 2022

(87) PCT Pub. No.: WO2021/193248
PCT Pub. Date: Sep. 30, 2021

(65) Prior Publication Data
US 2023/0117001 A1    Apr. 20, 2023

(30) Foreign Application Priority Data

Mar. 27, 2020   (JP) ................. 2020-058693

(51) Int. Cl.
C08L 77/06      (2006.01)
C08J 5/24       (2006.01)

(52) U.S. Cl.
CPC ............ C08L 77/06 (2013.01); C08J 5/243 (2021.05); C08J 5/244 (2021.05); C08J 2377/06 (2013.01); C08J 2477/00 (2013.01); C08L 2205/025 (2013.01); C08L 2205/03 (2013.01); C08L 2207/04 (2013.01)

(58) Field of Classification Search
CPC .................................. C08L 77/06; C08J 5/24
USPC ........................................................ 523/222
See application file for complete search history.

(56) References Cited

U.S. PATENT DOCUMENTS

| | | | |
|---|---|---|---|
| 2015/0175804 | A1 | 6/2015 | Aepli |
| 2017/0043526 | A1 | 2/2017 | Ohki et al. |
| 2017/0362401 | A1 | 12/2017 | Seidel et al. |
| 2020/0087458 | A1 * | 3/2020 | Ieda ............. C08K 3/32 |
| 2020/0384704 | A1 | 12/2020 | Aratani et al. |
| 2021/0292491 | A1 | 9/2021 | Ouchiyama et al. |

FOREIGN PATENT DOCUMENTS

| | | | |
|---|---|---|---|
| EP | 2886605 A1 | 6/2015 | |
| EP | 3378884 A1 | 9/2018 | |
| EP | 3467010 A1 | 4/2019 | |
| EP | 3763860 A1 | 1/2021 | |
| JP | 2003238213 A | 8/2003 | |
| JP | 2009019202 A | 1/2009 | |
| JP | 5987335 B2 | 9/2016 | |
| JP | 2017222859 A | 12/2017 | |
| JP | 2018150452 A | 9/2018 | |
| JP | 2019011420 A | 1/2019 | |
| JP | 2019014808 A | 1/2019 | |
| WO | 2015163218 A1 | 10/2015 | |
| WO | WO-2018181995 A1 * | 10/2018 | ............. C08L 77/06 |
| WO | 2019142803 A1 | 7/2019 | |
| WO | 2019172208 A1 | 9/2019 | |
| WO | 2019208586 A2 | 10/2019 | |
| WO | 2020017287 A1 | 1/2020 | |

OTHER PUBLICATIONS

May 25, 2021, International Search Report issued in the International Patent Application No. PCT/JP2021/010660.
Aug. 17, 2023, the Supplementary European Search Report issued by the European Patent Office in the corresponding European Patent Application No. 21777069.2.
Sep. 22, 2022, International Preliminary Report on Patentability issued in the International Patent Application No. PCT/JP2021/010660.

\* cited by examiner

*Primary Examiner* — Deve V Hall
(74) *Attorney, Agent, or Firm* — KENJA IP LAW PC

(57) ABSTRACT

A continuous fiber reinforced resin composite material of the present disclosure is a continuous fiber reinforced resin composite material containing continuous reinforcing fibers and a thermoplastic resin, wherein a peak temperature of tan δ at an interface between the continuous reinforcing fibers and the thermoplastic resin in the continuous fiber reinforced resin composite material is 80° C. or higher.

19 Claims, No Drawings

CONTINUOUS FIBER REINFORCED RESIN COMPOSITE MATERIAL AND METHOD OF PRODUCING SAME, AND CONTINUOUS FIBER REINFORCED RESIN MOLDED ARTICLE

TECHNICAL FIELD

The present disclosure relates to a continuous fiber reinforced resin composite material and a method of producing the same, and a continuous fiber reinforced resin molded article.

BACKGROUND

Structural components, such as a wide variety of machines and automobiles, pressure vessels, and tubular structures, employ composite formed articles which include matrix resins material and reinforcing materials such as glass fibers added thereto. In particular, from the viewpoint of the strength, continuous fiber reinforced resin composite materials including continuous fibers as reinforcing fibers are desirable. Such continuous fiber reinforced resin composite materials have been proposed, such as continuous fiber reinforced resin composite materials in which a particular bundling agent is added to reinforcing fibers (see, for example, PTL 1 below); in which the difference between the melting point and the crystallization temperature is adjusted (see, for example, PTL 2 below); in which an organic salt is added to a resin material (see, for example, PTL 3 below); and in which a fabric of a mold precursor is laminated with a thermoplastic resin (see, for example, PTL 4 below).

CITATION LIST

Patent Literature

PTL 1: JP 2003-238213 A
PTL 2: JP 5987335 B
PTL 3: JP 2017-222859 A
PTL 4: JP 2009-19202 A

SUMMARY

Technical Problem

Our extensive researches, however, have led to the finding that there is room for improvements in strength, rigidity, high-temperature characteristics, water absorption characteristics, impact characteristics, and appearance, in the continuous fiber reinforced resin composite materials of the prior art because the interfacial characteristics between a matrix resin and reinforcing fibers are not sufficient.

In view of the level of the prior art, it is an object of the present disclosure to provide a continuous fiber reinforced resin composite material which has improved interfacial characteristics between a matrix resin and a reinforcing fiber and is excellent in strength, rigidity, high-temperature characteristics, water absorption characteristics, impact characteristics, and appearance, a method for producing the same, and a continuous fiber reinforced resin molded article.

Solution to Problem

Surprisingly, we have found through our extensive studies and experiments for solving the aforementioned problem that a continuous fiber reinforced resin composite material having higher strength and rigidity, and excellent interfacial characteristics, high-temperature characteristics, water absorption characteristics, impact characteristics, and appearance can be produced by adjusting the viscoelastic properties of the interface of the continuous fiber reinforced resin composite material, thereby completing the present disclosure.

Specifically, the present disclosure is as follows:

(1)
A continuous fiber reinforced resin composite material comprising continuous reinforcing fibers and a thermoplastic resin, wherein
a peak temperature of tan δ at an interface between the continuous reinforcing fibers and the thermoplastic resin in the continuous fiber reinforced resin composite material is 80° C. or higher.

(2)
The continuous fiber reinforced resin composite material according to (1), wherein an interfacial strength of the continuous fiber reinforced resin composite material according to a push-out test is 1.58 to 5.00 mN/μm.

(3)
The continuous fiber reinforced resin composite material according to (1) or (2), wherein an interfacial constant of the continuous fiber reinforced resin composite material expressed by the following formula is 20 to 100:

(the interfacial constant)=(a carboxyl end group concentration [μmol/g]) of the continuous fiber reinforced resin composite material×(a polishing pressure [MPa]) at which a separation occurs at the interface×(a reinforcing fiber diameter [μm])/(a reinforcing fiber density $[g/cm^3])^2$ (4)
The continuous fiber reinforced resin composite material according to any one of (1) to (3), wherein the continuous reinforcing fiber composite material has a Raman peak at 950 to 1050 $cm^{-1}$.

(5)
The continuous fiber reinforced resin composite material according to any one of (1) to (4), wherein the thermoplastic resin comprises two or more thermoplastic resins.

(6)
The continuous fiber reinforced resin composite material according to any one of (1) to (5), wherein a peak intensity of a (1,0,0) plane by X-ray diffraction of the continuous fiber reinforced resin composite material is higher than a peak intensity of a (0,1,0) plane.

(7)
The continuous fiber reinforced resin composite material according to any one of (1) to (6), wherein a peak of the (1,1,0) plane is detected in X-ray diffraction of the continuous fiber reinforced resin composite material.

(8)
The continuous fiber reinforced resin composite material according to any one of (1) to (7), wherein
the continuous reinforcing fiber is a woven fabric, a unidirectional material, or a non-crimped fabric of glass fibers,
the thermoplastic resin comprises 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10, and
a weight average molecular weight (Mw) of the thermoplastic resin is 15000 to 35000.

(9)

The continuous fiber reinforced resin composite material according to (8), wherein a capped end amount which is expressed as an equivalent to 1 g of the aliphatic polyamide (A) and the semi-aromatic polyamide (B) is 5 to 180 µeq/g.

(10)

A continuous fiber reinforced resin molded article comprising continuous reinforcing fibers and a thermoplastic resin, wherein
a peak temperature of tan δ at an interface between the continuous reinforcing fibers and the thermoplastic resin in the continuous fiber reinforced resin molded article is 80° C. or higher, and an interfacial strength of the continuous fiber reinforced resin molded article according to a push-out test is 1.58 to 5.00 mN/µm, and the continuous fiber reinforced resin molded article has a plate shape, a frame shape, a box shape, or a combination thereof.

(11)

A method of producing a continuous fiber reinforced resin composite material according to any one of (1) to (9), comprising compositing continuous reinforcing fibers and a thermoplastic resin, wherein
a dynamic wettability between the continuous reinforcing fibers and the thermoplastic resin is 3.0 sec or less.

(12)

The method of producing a continuous fiber reinforced resin composite material according to (11), wherein a contact angle between the continuous reinforcing fibers and the thermoplastic resin according to a static wettability test is 38° or less.

(13)

The method of producing a continuous fiber reinforced resin composite material according to (11) or (12), wherein the thermoplastic resin comprises two or more thermoplastic resins, and a maximum value of a difference in the dynamic wettability between each of the two or more thermoplastic resins and the continuous reinforcing fibers is 3 sec or more.

(14)

The method of producing a continuous fiber reinforced resin composite material according to any one of (11) to (13), wherein
the thermoplastic resin comprises 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10, and
an end group concentration of the aliphatic polyamide (A) is a half or less of an end group concentration of the semi-aromatic polyamide (B).

(15)

The method of producing a continuous fiber reinforced resin composite material according to (14), wherein a difference in the peak temperature of tan δ between the aliphatic polyamide (A) and the semi-aromatic polyamide (B) is 45 to 100° C.

(16)

The method of producing a continuous fiber reinforced resin composite material according to (14) or (15), wherein a weight average molecular weight $Mw_A$ of the aliphatic polyamide (A) is 1.5 times or more of a weight average molecular weight $Mw_B$ of the semi-aromatic polyamide (B).

Advantageous Effect

The continuous fiber reinforced resin composite material and the continuous fiber reinforced resin molded article according to the present disclosure can have high strength and rigidity, and excellent interfacial characteristics, high-temperature characteristics, water absorption characteristics, impact characteristics, and appearance.

DETAILED DESCRIPTION

The following provides a detailed description of an embodiment of the present disclosure (hereinafter, referred to as the "present embodiment"). Note that the present embodiment set forth below is an illustrative embodiment for describing the present disclosure and is not intended to limit the present disclosure to the following matter.

[Continuous Fiber Reinforced Resin Composite Material]

A continuous fiber reinforced resin composite material of the present embodiment is a continuous fiber reinforced resin composite material containing continuous reinforcing fibers and a thermoplastic resin, wherein a peak temperature of tan δ at an interface between the continuous reinforcing fibers and the thermoplastic resin in the continuous fiber reinforced resin composite material is 80° C. or higher.

In this specification, the continuous fiber reinforced resin composite material of this embodiment is sometimes simply referred to as the "composite material".

The peak temperature of the loss tangent tan δ of the continuous fiber reinforced resin composite material of the present embodiment refers to the temperature at which the value of tan δ has a maximum when the tan δ at the interface between the continuous reinforcing fibers and the thermoplastic resin is measured at varied temperatures while the temperature is varied. In a case where there are maxima at two or more temperatures, the peak temperature having the largest maximum is defined as the peak temperature of tan δ. The peak temperature of tan δ can be determined, for example, by performing a nanoindentation (nanoDMA) on a single yarn of the continuous reinforcing fibers contained in the continuous fiber reinforced resin composite material in a cross section perpendicular to the length direction of the continuous reinforcing fibers by vibrating at a particular frequency using a nanoindenter, and specifically can be measured by the method described in Examples to be described below.

The peak temperature of tan δ of the continuous fiber reinforced resin composite material is 80° C. or higher, preferably 85° C. or higher, more preferably 90° C. or higher, and even more preferably 100° C. or higher.

As a method of adjusting the peak temperature of tan δ of the continuous fiber reinforced resin composite material so as to fall within any of the above ranges, for example, a method in which the static wettability is adjusted by adjusting the aromatic ring concentration is exemplified, and as the contact angle according to a static wettability test is reduced by increasing the aromatic ring concentration in the resin, the peak temperature of tan δ tends to increase.

The continuous fiber reinforced resin composite material of the present embodiment preferably has a Raman peak (a peak in a Raman spectrum) in a range of 950 to 1050 $cm^{-1}$, more preferably in a range of 970 to 1030 $cm^{-1}$.

A Raman peak of the continuous fiber reinforced resin composite material of the present embodiment can be obtained, for example, by measuring a Raman spectrum of the resin region in a cross section perpendicular to the length direction of the continuous reinforcing fibers contained in the continuous fiber reinforced resin composite material by a laser Raman microscope, and specifically can be measured by the method described in Examples to be described below. When the Raman peak is within any of the above ranges, good strength, rigidity, water absorption characteristics, high-temperature characteristics, and appearance tend to be achieved.

In the continuous fiber reinforced resin composite material of the present embodiment, the peak intensity I(1,0,0) of the (1,0,0) plane by X-ray diffraction is preferably higher than the peak intensity I(0,1,0) of the (0,1,0) plane. Specifically, the ratio (I(0,1,0)/I(1,0,0)) of the peak intensity I(0,1,0) of the (0,1,0) plane to the peak intensity I(1,0,0) of the (1,0,0) plane is preferably 0.30 to 0.95, more preferably 0.40 to 0.90, and even more preferably 0.50 to 0.87. When the ratio (I(0,1,0)/I(1,0,0)) is within any of the above ranges, good strength, rigidity, water absorption characteristics, impact characteristics, high-temperature characteristics, and appearance tend to be achieved.

In the continuous fiber reinforced resin composite material of the present embodiment, a peak of the (1,1,0) plane is preferably detected in X-ray diffraction. When a peak of the (1, 1, 0) plane is detected, good strength, rigidity, water absorption characteristics, impact characteristics, high-temperature characteristics, and appearance tend to be achieved.

Peaks of X-ray diffraction of the continuous fiber reinforced resin composite material can be analyzed, for example, by using an X-ray diffractometer, and specifically can be analyzed by the method described in Examples to be described below.

The interfacial strength of the continuous fiber reinforced resin composite material of the present embodiment (the interfacial strength between the matrix resin and the reinforcing fibers in the continuous fiber reinforced resin composite material) is preferably 1.58 mN/μm or more, more preferably 1.65 mN/μm or more, even more preferably 1.75 mN/μm or more, and still more preferably 1.85 mN/μm or more. Further, the interfacial strength is preferably 5.00 mN/μm or less, more preferably 4.50 mN/μm or less, and even more preferably 3.50 mN/μm or less. When the interfacial strength is within any of the above ranges, the strength, the rigidity, the water absorption characteristics, the impact characteristics, and the high-temperature characteristics tend to be improved.

The interfacial strength of the continuous fiber composite material can be determined, for example, by performing a push-out test using a nanoindenter on a single yarn of the continuous reinforcing fibers in a cross section perpendicular to the length direction of the continuous reinforcing fibers contained in the continuous fiber reinforced resin composite material, and specifically can be measured by the method described in Examples to be described below.

As a method of adjusting the interfacial strength according to a push-out test of the continuous fiber reinforced resin composite material of the present embodiment so as to fall within any of the above ranges, for example, a method of adjusting the dynamic wettability and the static wettability between the thermoplastic resin and the continuous reinforcing fibers is exemplified, and as the dynamic wettability is reduced and the contact angle according to a static wettability test is reduced, the interfacial strength tends to increase.

The interfacial constant of the continuous fiber reinforced resin composite material of the present embodiment expressed by the following formula is preferably 20 or more, more preferably 30 or more, even more preferably 50 or more, and still more preferably 65 or more. The interfacial constant is preferably 100 or less, more preferably 90 or less, even more preferably 80 or less.

(interfacial constant)=(carboxyl end group concentration [μmol/g]) of the continuous fiber reinforced resin composite material×(polishing pressure [MPa]) at which a separation occurs at the interface×(reinforcing fiber diameter [μm])/(reinforcing fiber density [g/cm$^3$])$^2$ When the interfacial constant is within any of the above ranges, good strength, rigidity, water absorption characteristics, and high-temperature characteristics tend to be achieved.

In the above formula, the "carboxyl end group concentration of the continuous fiber reinforced resin composite material" can be measured using $^1$H-NHR, and specifically can be measured by the method described in Examples to be described below.

The "polishing pressure at which a separation occurs at the interface" is a pressure at which a gap is formed at the polar interface between a single yarn of the continuous reinforcing fibers and the thermoplastic resin in a cross section perpendicular to the length direction of the continuous reinforcing fibers when a cross section of the continuous fiber reinforcing resin in the thickness direction (a cross section perpendicular to the length direction of the continuous reinforcing fibers) is cut into a piece in a predetermined size, polishing is performed under varied pressures, and SEM observations of the polished samples are performed.

The "reinforcing fiber diameter" is obtained by cutting a cross section in the thickness direction of the continuous fiber reinforced resin (a cross section perpendicular to the length direction of the continuous reinforcing fibers) into a piece in a predetermined size, performing polishing, and performing an SEM observation of the polished sample, and measuring diameters of 10 or more continuous reinforcing fibers based on substantially round cross sections of the continuous reinforcing fibers in the cross section perpendicular to the length direction of the continuous reinforcing fibers, and determining the average thereof.

The "reinforcing fiber density" can be determined by, for example, burning off the thermoplastic resin in the continuous fiber reinforced resin using an electric furnace and analyzing the remaining continuous reinforcing fibers by a specific gravity meter.

The tensile stress (23° C. and 50% RH) of the continuous fiber reinforced resin composite material of the present embodiment is preferably 500 MPa or more, and more preferably 540 MPa or more.

Further, the tensile stress retention ratio of the continuous fiber reinforced resin composite material at 80° C. is preferably 80% or more, and more preferably 90% or more.

Further, the tensile stress retention ratio of the continuous fiber reinforced resin composite material when water is absorbed is preferably 80% or more, and more preferably 90% or more.

The tensile stress can be measured by the method described in Examples to be described below. Upon measurement of a tensile stress when water is absorbed, a specimen was immersed in a constant temperature water bath of 80° C. for 18 hours, and allowed to stand for 150 hours or longer in a constant temperature and constant humidity chamber at 80° C. and 57% RH to adjust the humidity until the mass becomes a constant value to thereby provide a sample when water is absorbed.

The tensile stress retention ratio (%) at 80° C. and the tensile stress retention ratio (%) when water is absorbed can each be obtained by the following formulae.

Tensile stress retention ratio at 80° C.=(tensile stress at 80° C. and 50% *RH*/tensile stress at 23° C. and 50% *RH*)×100

Tensile stress retention ratio when water is absorbed=(tensile stress when water is absorbed/tensile stress at 23° C. and 50% *RH*)×100

The bending stress (23° C. and 50% RH) of the continuous fiber reinforced resin composite material of the present embodiment is preferably 700 MPa or more, and more preferably 800 MPa or more.

Further, the bending stress retention ratio of the continuous fiber reinforced resin composite material at 80° C. is preferably 60% or more, and more preferably 65% or more.

Further, the bending stress retention ratio of the continuous fiber reinforced resin composite material when water is absorbed is preferably 80% or more, and more preferably 90% or more.

The bending stress can be measured by the method described in Examples to be described below. The bending stress when water is absorbed can be measured in the similar manner using the specimen for measuring the tensile stress when water is absorbed described above.

The bending stress retention ratio (%) at 80° C. and the bending stress retention ratio (%) when water is absorbed can each be obtained by the following formulae.

Bending stress retention ratio at 80° C.=(bending stress at 80° C. and 50% *RH*/bending stress at 23° C. and 50% *RH*)×100

Bending stress retention ratio when water is absorbed=(bending stress when water is absorbed/bending stress at 23° C. and 50% *RH*)×100

The bending elastic modulus (23° C. and 50% RH) of the continuous fiber reinforced resin composite material of the present embodiment is preferably 26 GPa or more, and more preferably 27 GPa or more.

Further, the bending elastic modulus retention ratio at 80° C. of the continuous fiber reinforced resin composite material preferably is preferably 80% or more, more preferably 90% or more.

The bending elastic modulus retention ratio when water is absorbed of the continuous fiber reinforced resin composite material is preferably 80% or more, and more preferably 90% or more.

The bending elastic modulus can be measured by the method described in Examples to be described below. The bending elastic modulus when water is absorbed can be measured in the similar manner using the specimen for measuring the tensile stress when water is absorbed described above.

The bending elastic modulus retention ratio (%) at 80° C. and the Bending elastic modulus retention ratio (%) when water is absorbed can each be obtained by the following formulae.

Bending elastic modulus retention ratio at 80° C.=(bending elastic modulus at 80° C. and 50% *RH*/bending elastic modulus at 23° C. and 50% *RH*)×100

Bending elastic modulus retention ratio when water is absorbed=(bending elastic modulus when water is absorbed/bending elastic modulus at 23° C. and 50% *RH*)×100

The impact strength of the continuous fiber reinforced resin composite material of the present embodiment is preferably 5.0 kN/m or more, and more preferably 5.5 kN/m or more.

The impact strength is a value obtained by dividing the maximum impact strength (kN) determined according to a high-speed impact test (JIS K7211-2; 2006) by the thickness of a specimen, and can be specifically measured by the method described in Examples to be described below.

(Form of Continuous Fiber Reinforced Resin Composite Material)

The form of the continuous fiber reinforced resin composite material is not particularly limited, and the following various forms are possible. Examples include a form in which continuous reinforcing fibers in the form of a woven fabric, knitted fabric, braid string, or pipe are compounded with a thermoplastic resin, a form in which continuous reinforcing fibers aligned in one direction are compounded with a thermoplastic resin, a form in which yarns composed of continuous reinforcing fibers and a thermoplastic resin are aligned in one direction and molded, and a form in which yarns composed of continuous reinforcing fibers and a thermoplastic resin are formed into a woven fabric, a knitted fabric, a braid string, and a pipe, and are then molded, for example.

The continuous fiber reinforced resin composite material of this embodiment may be a flat plate which may be a laminate comprising layers of continuous reinforcing fibers and layers of a thermoplastic resin. For example, the length direction of the continuous reinforcing fibers may be substantially parallel to the surface of the flat plate, in which case a cross section perpendicular to the length direction of the continuous reinforcing fibers in the continuous fiber reinforced resin composite material may be a cross section of the continuous fiber reinforced resin composite material in the thickness direction. The term "layer of continuous reinforcing fibers" refers to a layer which includes continuous reinforcing fibers (e.g., continuous reinforcing fiber base material), and may be a layer in which a thermoplastic resin is impregnated inside the continuous reinforcing fibers.

Examples of the form of an intermediate material before being molded into the continuous fiber reinforced resin composite material include combined filament yarns of continuous reinforcing fibers and resin fibers; coated yarns in which the periphery of a bundle of continuous reinforcing fibers is coated with a resin; continuous reinforcing fibers having a resin impregnated therein are formed into a tape; continuous reinforcing fibers sandwiched between resin films; continuous reinforcing fibers having resin powder adhered thereto; a braid made of a bundle of continuous reinforcing fibers as a core material and resin fibers surrounding the bundle; and reinforcing fibers in which a resin has been impregnated between the reinforcing fibers.

(Method of Producing Continuous Fiber Reinforced Resin Composite Material)

The method of producing the continuous fiber reinforced resin composite material is not particularly limited, and a wide variety of methods may be used.

For example, base materials composing a continuous fiber reinforced resin composite material (e.g., a base material made of continuous reinforcing fibers and a base material made of a thermoplastic resin) are cut according to a desired composite material. The sheets of the base materials are laminated in number that is determined based on the thickness of an intended product, and are set so as to conform to the shape of a mold.

The method of producing a continuous fiber reinforced resin composite material of the present embodiment is preferably a method comprising compositing a thermoplastic resin and continuous reinforcing fibers, and the dynamic wettability between the continuous reinforcing fibers and the thermoplastic resin is preferably 3.0 sec or less. Further, the thermoplastic resin preferably contains two or more thermoplastic resins.

The dynamic wettability between the continuous reinforcing fibers and the thermoplastic resin can be measured, for example, using a solder wettability tester by immersing a single yarn of the continuous reinforcing fibers in the molten thermoplastic resin, and measuring the time duration (wetting time) from the time when the continuous reinforcing fiber is brought into contact with the thermoplastic resin and the load is maximized having a negative maximum value until the time when the load returns to zero, and specifically can be measured by the method described in the examples described below.

The dynamic wettability between the continuous reinforcing fibers and the thermoplastic resin is preferably 3.0 sec or less, more preferably 2.5 sec or less, and even more preferably 2.0 sec or less. When the dynamic wettability is within any of the above ranges, a good interface can be formed.

When the continuous fiber reinforced resin composite material of the present embodiment contains two or more thermoplastic resins, the maximum difference in the dynamic wettability of the thermoplastic resins may be 3 sec or more.

The contact angle between the continuous reinforcing fibers and the thermoplastic resin according to a static wettability test is preferably 38° or less, more preferably 36° or less, even more preferably 34° or less, still more preferably 32° or less, and particularly preferably 30° or less. When the contact angle according to a static wettability test is within any of the above ranges, a good interface can be formed.

The contact angle according to a static wettability test can be measured by, for example, sandwiching a single yarn of the continuous reinforcing fibers and a film of the thermoplastic resin between glass covers, and observing the contact angle between the continuous reinforcing fiber and the resin under an optical microscope when the temperature is raised, and specifically can be measured by the method described in Examples described later.

The base materials may be cut one by one, or may be cut after a desired number of sheets are overlapped one another. From the viewpoint of the productivity, it is preferable to cut the base materials after they are overlapped one another. The cutting may be achieved by any means, such as a water jet, a saw blade press machine, a hot saw blade press machine, a laser, and a plotter, for example. A hot saw blade press machine is preferably used because a good cross section is obtained and a laminate of a multiple sheets of base materials is cut while cut ends are welded together, which improves the handability. Although an appropriate cutting shape can be identified through try and error, it is preferable that the appropriate cutting shape is determined according to the shape of a mold through a simulation by computer aided engineering (CAE).

After the base materials are set in a mold, the mold is closed and is compressed. The temperature of the mold is adjusted to a temperature equal to or higher than the melting point of the thermoplastic resin composing the continuous fiber reinforced resin composite material to cause the thermoplastic resin to melt and be shaped. The mold clamping pressure is, but not limited to, preferably 1 MPa or more, and more preferably 3 MPa or more. Furthermore, after the mold is clamped and compression molding is carried out, the mold clamping pressure may be released for degassing or the like. It is preferable that compression molding is carried out for as long time as possible to the extent where the thermoplastic resin which is used does not undergo thermal aging from the viewpoint of imparting a strength. Nevertheless, from the viewpoint of the productivity, the compression molding time is preferably within 2 minutes, more preferably within 1 minute.

Additionally, a hybridizing thermoplastic resin composition may be injected to the continuous fiber reinforced resin composite material to produce a hybrid formed article through injection filling. The manufacturing process of the hybrid formed article may include setting base materials into a mold and closing the mold, pressing the mold, waiting for a predetermined period of time, and then injecting a certain hybridizing thermoplastic resin composition into the mold to cause the thermoplastic resin and the hybridizing thermoplastic resin composition to be joined together.

The timing of injection filling of the certain hybridizing thermoplastic resin composition greatly affects the interfacial strength between the two thermoplastic resins. The timing of injection filling of the certain hybridizing thermoplastic resin composition is preferably within 30 seconds after the temperature of the mold reaches the melting point or the glass transition temperature of the thermoplastic resin or higher, after the base materials are set in the mold and the mold is closed.

The mold temperature at which the certain hybridizing thermoplastic resin composition is injection filled is preferably equal to or higher than the melting point or equal to or higher than the glass transition temperature of the thermoplastic resin which composes the continuous fiber reinforced resin composite material, and which is to be bonded to the hybridizing thermoplastic resin composition. The mold temperature is more preferably a temperature of the melting point plus 10° C. or higher or the glass transition temperature plus 10° C. or higher of the thermoplastic resin which composes the continuous fiber reinforced resin composite material, and which is to be joined with the hybridizing thermoplastic resin composition, and is more preferably a temperature of the melting point plus 20° C. or higher or the glass transition temperature plus 20° C. or higher, even more preferably a temperature of the melting point plus 30° C. or higher or the glass transition temperature plus 30° C. or higher.

In the hybrid formed article, it is preferable that the joined portion formed by injection molding between the thermoplastic resin composing the continuous fiber reinforced resin composite material and the hybridizing thermoplastic resin composition has irregularities where the both resins are mixed together.

Setting the mold temperature to be equal to or higher than the melting point of the hybridizing thermoplastic resin composition to be injected, and setting the resin holding pressure during injection molding to a high value, for example, so as to be equal or higher than 1 MPa are effective in improving the interfacial strength. For enhancing the interfacial strength, the holding pressure is preferably set to 5 MPa or more, and more preferably 10 MPa or more.

From the viewpoint of enhancing the interfacial strength, it is preferable to keep the mold pressure for long time, for example, for 5 seconds or longer, preferably 10 seconds or longer, and more preferably a time period until the mold temperature becomes equal to or lower than the melting point of the thermoplastic resin composition.

(Resin for Injection Molding)

The hybridizing thermoplastic resin composition which is used for injection molding to produce a hybrid formed article is not particularly limited as long as it is a thermoplastic resin composition generally used for injection molding.

Examples of the hybridizing thermoplastic resin composition include, but are not limited to, resin compositions obtained by mixing one or two or more of polyethylene, polypropylene, polyvinyl chloride, acrylic resins, styrene-based resins, polyethylene terephthalate, polybutylene terephthalate, polyarylate, polyphenylene ether, modified polyphenylene ether resins, fully aromatic polyester, polyacetal, polycarbonate, polyetherimide, polyether sulfone, polyamide-based resins, polysulfone, polyether ether ketone, and polyether ketone.

The hybridizing thermoplastic resin composition may contain any of various fillers blended thereto. The hybridizing thermoplastic resin composition may be a black resin composition containing a colorant.

Examples of the filler include short- and long-fiber materials, which are non-continuous reinforcing materials of the same material as the material of the continuous reinforcing fibers.

When glass short or long fibers are used as the non-continuous reinforcing material, the same bundling agent as the bundling agent applied to the continuous reinforcing fibers composing the continuous fiber reinforced resin composite material of the present embodiment may be used.

The sizing agent (bundling agent) preferably includes a silane coupling agent, a lubricant, and a binding agent. As the silane coupling agent, the lubricant, and the binding agent, those used for the bundling agent for the continuous reinforcing fibers can be used.

The thermoplastic resin contained in the hybridizing thermoplastic resin composition used for injection molding is preferably a thermoplastic resin similar to, more preferably the same thermoplastic resin composition as, the thermoplastic resin composing the continuous fiber reinforced resin composite material, from the viewpoint of the interfacial strength with the thermoplastic resin to be joined together. Specifically, when polyamide 66 is used as the thermoplastic resin for the surface to be joined, the resin material in the thermoplastic resin composition used for injection molding is preferably polyamide 66.

Other examples include a molding method in which base materials are set in a mold and the mold is compressed by a double belt press machine; a method in which a mold frame is disposed so as to surround the four sides of arranged base materials and is pressurized by a double belt press machine for achieving molding; and a method in which a compression molding machine set to one or more temperatures is used together with a compression molding machine for cooling set to one or more temperatures, and a mold having base materials set therein is loaded to the compression molding machines in sequence for achieving molding.

(Continuous Reinforcing Fibers)

The continuous reinforcing fibers may be continuous reinforcing fibers generally used for continuous fiber reinforced resin composite materials.

Examples of the continuous reinforcing fibers include, but are not limited to, glass fibers, carbon fibers, plant fibers, aramid fibers, ultra-high strength polyethylene fibers, polybenzazole-based fibers, liquid crystal polyester fibers, polyketone fibers, metal fibers, and ceramic fibers.

Glass fibers, carbon fibers, plant fibers, and aramid fibers are preferable from the viewpoint of mechanical properties, thermal properties, and versatility, whereas glass fibers are preferable from the viewpoint of the productivity.

In a case in which glass fibers are selected as continuous reinforcing fibers, a bundling agent may be used. The sizing agent (bundling agent) preferably includes a silane coupling agent, a lubricant, and a binding agent. In a case in which a bundling agent is capable of forming strong bonds with a resin which coats the peripheries of the continuous reinforcing fibers, a continuous fiber reinforced resin composite material having a small void ratio can be achieved. In a case in which a thermoplastic resin is used as a synthetic resin, the bundling agent is preferably a bundling agent for thermoplastic resins. In a case in which a polyamide resin is selected as a synthetic resin, for example, a silane coupling agent used in the bundling agent for a thermoplastic resin is required to be one which can easily bond to carboxyl groups and amino groups which are terminal groups of a polyamide resin. Specific examples of the silane coupling agent include γ-aminopropyl trimethoxysilane and epoxysilane. The binding agent used is required to be a resin which has a high wettability with a polyamide resin or has a surface tension close to the surface tension of a polyamide resin. Specifically, for example, an emulsion of a polyurethane resin or an emulsion of a polyamide resin or a modified product thereof can be selected. The lubricant used is required to be one which does not inhibit the silane coupling agent and the binding agent, and an example thereof is carnauba wax.

—Silane Coupling Agent—

The silane coupling agent is generally used as a surface treatment agent for glass fibers, and contributes to enhance the interfacial adhesive strength.

Examples of the silane coupling agent include, but are not limited to, aminosilanes such as γ-aminopropyl trimethoxysilane and N-β-(aminoethyl)-γ-aminopropylmethyl dimethoxysilane; mercaptosilanes such as γ-mercaptopropyl trimethoxysilane and γ-mercaptopropyl triethoxysilane; epoxysilanes; vinylsilanes, and silanes modified with maleic acid. In a case in which a polyamide is used as the synthetic resin, aminosilanes and silanes modified with maleic acid are preferable. In a case in which an epoxy resin is used as the synthetic resin, epoxysilanes are preferable.

—Lubricant—

The lubricant contributes to improving the spreadability of glass fibers.

As the lubricant, any conventional liquid or solid lubricating materials can be used according to the intended purpose, and examples thereof include, but are not limited to, animal or plant waxes or mineral waxes such as carnauba wax and lanolin wax; and surfactants such as fatty acid amides, fatty acid esters, fatty acid ether, aromatic esters, and aromatic ether.

—Binding Agent—

The binding agent contributes to improving the bundlability of the glass fibers and the interfacial adhesive strength.

As the binding agent, a polymer or a thermoplastic resin can be used according to the intended purpose.

Examples of the polymer as the binding agent include, but are not limited to, a homopolymer of acrylic acid, a copolymer of acrylic acid and another copolymerizable monomer, and salts of primary, secondary, and tertiary amines with these, for example. In addition, polyurethane-based resins synthesized from an isocyanate such as m-xylylene diisocyanate, 4,4'-methylenebis(cyclohexylisocyanate), and isophorone diisocyanate, and a polyester- or polyether-based diol are also suitably used, for example.

The homopolymer of acrylic acid has a number average molecular weight of preferably from 1,000 to 90,000 and more preferably from 1,000 to 25,000.

The other polymerizable monomer composing the copolymer of acrylic acid and the other copolymerizable monomer is, but not limited to, one or more monomers selected from the group consisting of acrylic acid, maleic acid, methacrylic acid, vinyl acetic acid, crotonic acid, isocrotonic acid, fumaric acid, itaconic acid, citraconic acid, and mesaconic acid (except for cases where only acrylic acid is used), among monomers having a hydroxyl group and/or carboxyl group, for example. It is preferable that the copolymerizable monomer includes one or more ester-based monomers.

Examples of primary, secondary, and tertiary amines of a homopolymer or copolymer of acrylic acid include, but are not limited to, triethylamine salts, triethanolamine salts, and glycine salts, for example. The degree of neutralization is preferably 20 to 90%, and more preferably 40 to 60%, from the viewpoint of improving the stability of a mixed solution with other agents (such as a silane coupling agent) which are used together, and reducing the amine odor.

The weight average molecular weight of the polymer of acrylic acid composing the salt is not particularly limited, but is preferably in the range of 3,000 to 50,000. The weight average molecular weight of the polymer is preferably 3,000 or more from the viewpoint of improving the bundlability of the glass fibers, and is preferably 50,000 or less from the viewpoint of improving the properties when being formed into a composite shaped article.

Examples of the thermoplastic resin used as the binding agent include, but are not limited to, polyolefin-based resins, polyamide-based resins, polyacetal-based resins, polycarbonate-based resins, polyester-based resins, polyether ketone, polyether ether ketone, polyether sulfone, polyphenylene sulfide, thermoplastic polyetherimide, thermoplastic fluorine-based resins, and modified thermoplastic resins produced by modifying these resins, for example. It is preferable that the thermoplastic resin used as the binding agent is a thermoplastic resin and/or a modified thermoplastic resin which is the same as the resin covering the peripheries of continuous reinforcing fibers, because the adhesion between the glass fibers and the thermoplastic resin is improved after they are processed into a composite material.

Further, the thermoplastic resin used as the binding agent is more preferably a modified thermoplastic resin from the viewpoint of further improving the adhesion between the continuous reinforcing fibers and the thermoplastic resin covering the continuous reinforcing fibers, and reducing the ratio of an emulsifier component or eliminating the need for an emulsifier in a case in which the bundling agent in an aqueous dispersion is made to adhere to the glass fibers.

Here, the term "modified thermoplastic resin" refers to a material obtained through copolymerization of a monomer component which can form the main chain of the thermoplastic resin with a different monomer component for the purpose of modifying the properties of the thermoplastic resin to thereby modify the hydrophilicity, the crystallinity, the thermodynamic properties, and the like.

Example of the modified thermoplastic resin used as the binding agent include, but are not limited to, modified polyolefin-based resins, modified polyamide-based resins, and modified polyester-based resins.

The term "modified polyolefin-based resin as the binding agent" is a copolymer of an olefinic monomer such as ethylene and propylene, and a monomer copolymerizable with the olefinic monomer such as unsaturated carboxylic acids. Such a modified thermoplastic resin can be produced by any of known methods. The modified polyolefin-based resin may be a random copolymer produced through copolymerization of an olefinic monomer and an unsaturated carboxylic acid, or may be a graft copolymer in which an unsaturated carboxylic acid is grafted to an olefin.

Examples of the olefinic monomer include, but are not limited to, ethylene, propylene, and 1-butene. These monomers may be used alone or in a combination of two or more. Examples of the monomer copolymerizable with the olefinic monomer include unsaturated carboxylic acids such as acrylic acid, maleic acid, maleic anhydride, methacrylic acid, vinyl acetic acid, crotonic acid, isocrotonic acid, fumaric acid, itaconic acid, citraconic acid, and mesaconic acid, for example. These monomers may be used alone or in a combination of two or more.

The copolymerization ratio of the olefinic monomer to the monomer copolymerizable with that olefinic monomer is preferably 60 to 95 mass % of the olefinic monomer to 5 to 40 mass % of the monomer copolymerizable with the olefinic monomer, and more preferably 70 to 85 mass % of the olefinic monomer to 15 to 30 mass % of the monomer copolymerizable with the olefinic monomer, with respect to the total mass of the copolymer taken as 100 mass %. When the mass % of the olefinic monomer is 60 mass % or more, a favorable affinity with the matrix is achieved. On the other hand, when the mass % of the olefinic monomer is 95 mass % or less, a good water dispersibility of the modified polyolefin-based resin is achieved, facilitating uniform application of the modified polyolefin-based resin to the continuous reinforcing fibers.

In the modified polyolefin-based resin used as the binding agent, a modified group such as a carboxyl group introduced through copolymerization may be neutralized with a basic compound. Examples of the basic compound include, but are not limited to, alkalis such as sodium hydroxide and potassium hydroxide; and amines such as ammonia, monoethanolamine, and diethanolamine, for example. The weight average molecular weight of the modified polyolefin-based resin used as a binding agent is not particularly limited, but is preferably 5,000 to 200,000, and more preferably 50,000 to 150,000. The weight average molecular weight is preferably 5,000 or more from the viewpoint of improving the bundlability of the glass fibers, and is preferably 200,000 or less from the viewpoint of the emulsification stability when used in a water dispersion.

The term "modified polyamide-based resin used as the binding agent" refers to a modified polyamide compound in which a hydrophilic group such as a polyalkylene oxide chain or a tertiary amine component is introduced to the molecular chain. Such a modified polyamide-based resin can be produced by any of known methods.

A modified polyamide-based resin having a polyalkylene oxide chain introduced to the molecular chain thereof is produced through copolymerization of a modified polyethylene glycol or polypropylene glycol which are partially or entirely modified to a diamine or dicarboxylic acid, for example. A modified polyamide-based resin having a tertiary amine component introduced thereto is produced through copolymerization of aminoethylpiperazine, bisaminopropylpiperazine, α-dimethylamino ε-caprolactam, or the like, for example.

The term "modified polyester-based resin used as the binding agent" refer to a copolymer of a polycarboxylic acid or anhydride thereof and a polyol, and the copolymer has a hydrophilic group in the molecular skeleton thereof including terminals. Such a modified polyester-based resin can be produced by any of known methods.

Examples of the hydrophilic group include a polyalkylene oxide group, a sulfonic acid salt, a carboxyl group, and neutralized salts thereof, for example. Examples of the polycarboxylic acid or anhydride thereof include an aromatic dicarboxylic acid, a sulfonic acid group-containing aromatic dicarboxylic acid, an aliphatic dicarboxylic acid, an alicyclic dicarboxylic acid, and a polycarboxylic acid having three or more functionalities.

Examples of the aromatic dicarboxylic acid include, but are not limited to, phthalic acid, terephthalic acid, isophthalic acid, orthophthalic acid, 1,5-naphthalene dicarboxylic acid, 2,6-naphthalene dicarboxylic acid, and phthalic anhydride, for example.

Examples of the sulfonic acid group-containing aromatic dicarboxylic acid include, but are not limited to, sulfoterephthalic acid salts, 5-sulfoisophthalic acid salts, and 5-sulfoothophthalic acid salts.

Examples of the aliphatic dicarboxylic acid or alicyclic dicarboxylic acid include, but are not limited to, fumaric acid, maleic acid, itaconic acid, succinic acid, adipic acid, azelaic acid, sebacic acid, dimer acids, 1,4-cyclohexanedicarboxylic acid, succinic anhydride, and maleic anhydride, for example.

Examples of polycarboxylic acid having three or more functionalities include, but are not limited to, trimellitic acid, pyromellitic acid, trimellitic anhydride, and pyromellitic anhydride, for example.

Among these, from the viewpoint of improving the heat resistance of the modified polyester-based resin, it is preferable that 40 to 99 mol % of the all polycarboxylic acid components is an aromatic dicarboxylic acid. In addition, from the viewpoint of the emulsification stability when the modified polyester-based resin is used in a water dispersion, it is preferable that 1 to 10 mol % of the all polycarboxylic acid components is a sulfonic acid group-containing aromatic dicarboxylic acid.

Examples of the polyol composing the modified polyester-based resin include diols, as well as polyols with three or more functionalities.

Examples of the diols include, but are not limited to, ethylene glycol, diethylene glycol, polyethylene glycol, propylene glycol, polypropylene glycol, polybutylene glycol, 1,3-propanediol, 1,4-butanediol, 1,6-hexanediol, neopentyl glycol, polytetramethylene glycol, 1,4-cyclohexanediol, 1,4-cyclohexanedimethanol, and Bisphenol A and an alkylene oxide adduct thereof, for example.

Examples of the polyols having three or more functionalities include trimethylolpropane, glycerin, and pentaerythritol.

The copolymerization ratio of the polycarboxylic acid or anhydride thereof to the polyol composing the modified polyester-based resin is preferably 40 to 60 mass % of the polycarboxylic acid or anhydride thereof to 40 to 60 mass % of the polyol, and more preferably 45 to 55 mass % of the polycarboxylic acid or anhydride thereof to 45 to 55 mass % of the polyol, with respect to the total mass of the copolymer components taken as 100 mass %.

The weight average molecular weight of the modified polyester-based resin is preferably from 3,000 to 100,000 and more preferably from 10,000 to 30,000. The weight average molecular weight of the modified polyester-based resin is preferably 3,000 or more from the viewpoint of improving the bundlability of the glass fibers, and is preferably 100,000 or less from the viewpoint of the emulsification stability when used in a water dispersion.

One polymer or thermoplastic resin used as the bundling agent may be used alone, or two or more of these may be used in combination.

One or more polymers selected from a homopolymer of acrylic acid, a copolymer of acrylic acid and another copolymerizable monomer, and salts of primary, secondary, and tertiary amines of these are included in an amount of preferably 50 mass % or more, and more preferably 60 mass % or more, with respect to the total amount of the binding agent taken as 100 mass %.

—Composition of Bundling Agent for Glass Fibers—

When glass fibers are used as continuous reinforcing fibers, it is preferable that the bundling agent for the glass fibers contains 0.1 to 2 mass % of the silane coupling agent, 0.01 to 1 mass % of the lubricant, and 1 to 25 mass % of the binding agent, and it is preferable that these components are diluted with water so that the total mass of the bundling agent becomes 100 mass %.

The amount of the silane coupling agent in the bundling agent for glass fibers is preferably from 0.1 to 2 mass %, more preferably from 0.1 to 1 mass %, and even more preferably from 0.2 to 0.5 mass %, from the viewpoint of improving the bundlability of the glass fibers, improving the interfacial adhesive strength, and improving the mechanical strength of a composite shaped article.

The amount of the lubricant in the bundling agent for glass fibers is preferably 0.01 mass % or more and more preferably 0.02 mass % or more from the viewpoint of imparting a sufficient lubricity, and is preferably 1 mass % or less and more preferably 0.5 mass % or less from the viewpoint of improving the interfacial adhesive strength and improving the mechanical strength of a composite shaped article.

The amount of the binding agent in the bundling agent for glass fibers is preferably from 1 to 25 mass %, more preferably from 3 to 15 mass %, and even more preferably from 3 to 10 mass %, from the viewpoint of controlling the bundlability of the glass fibers, improving the interfacial adhesive strength, and improving the mechanical strength of a composite shaped article.

—Usage Form of Bundling Agent for Glass Fibers—

The bundling agent for glass fibers may be prepared in any forms, such as in a form of an aqueous solution, a form of a colloidal dispersion, and a form of an emulsion with the aid of an emulsifier, depending on how bundling agent for glass fibers is used. The bundling agent is preferably used in the form of an aqueous solution from the viewpoint of improving the dispersion stability of the bundling agent and improving the heat resistance.

The glass fibers as continuous reinforcing fibers composing the continuous fiber reinforced resin composite material of this embodiment are continuously produced in a known glass fiber manufacturing process by applying the bundling agent to glass fibers using a known method such as a roller-type applicator, and drying the produced glass fibers.

The amount of the bundling agent to be applied, as the total mass of the silane coupling agent, the lubricant, and the binding agent, is preferably 0.1 to 3 mass %, more preferably 0.2 to 2 mass %, and even more preferably 0.2 to 1 mass %, with respect to 100 mass % of the glass fibers.

The amount of the bundling agent to be applied, as the total mass of the silane coupling agent, the lubricant, and the binding agent, is preferably 0.1 mass % or more from the viewpoint of controlling the bundlability of the glass fibers and improving the interfacial adhesive strength, and is preferably 3 mass % or less from the viewpoint of the handleability of the yarns, with respect to 100 mass % of the glass fibers.

Note that, in a case in which carbon fibers are selected as the continuous reinforcing fibers, the bundling agent preferably includes a coupling agent, a lubricant, and a binding agent. The coupling agent may be one which is compatible with hydroxyl groups present on the surfaces of carbon fibers. The binding agent may be one which has a good wettability with or a surface tension close to the surface tension of the selected synthetic resin. The lubricant may be one which does not inhibit the coupling agent and the binding agent.

In the case in which other continuous reinforcing fibers are used, the type and amount of the bundling agent to be applied may be appropriately selected from those for bundling agents used for glass fibers or carbon fibers, depending on the characteristics of the continuous reinforcing fibers, and it is preferable that the type and amount of the bundling agent to be applied may be those for a bundling agent used for carbon fibers.

—Shape of Continuous Reinforcing Fiber—

The continuous reinforcing fibers are a multifilament of a plurality of filaments, and have a single yarn count of preferably 30 to 15,000 from the viewpoint of the handleability. The single yarn diameter of the continuous reinforcing fibers is preferably 2 to 30 µm, more preferably 4 to 25 µm, even more preferably 6 to 20 µm, and most preferably 8 to 18 µm, from the viewpoint of the strength and from the viewpoint of the handleability.

The product RD of the single yarn diameter R (µm) and the density D (g/cm$^3$) of the continuous reinforcing fibers is preferably from 5 to 100 µm·g/cm$^3$, more preferably from 10 to 50 µm·g/cm$^3$, even more preferably from 15 to 45 µm·g/cm$^3$, and still more preferably from 20 to 45 µm·g/cm$^3$, from the viewpoint of the handleability of the continuous reinforcing fibers and the strength of the composite material.

The density D can be measured using a specific gravity meter. The single yarn diameter (µm) can be calculated from the density (g/cm$^3$), the fiber fineness (dtex), and the single yarn count using the following formula:

$$\text{single yarn diameter} = 20 \times \sqrt{\frac{\text{fiber fineness}}{\pi \times \text{single yarn count} \times \text{density}}}$$

In order to control a product RD of the continuous reinforcing fiber to fall within a certain range, the fiber fineness (dtex) and the single yarn count may be appropriately selected according to the density of commercially available continuous reinforcing fibers. For example, in a case in which glass fibers are used as continuous reinforcing fibers, the density of glass fibers is about 2.5 g/cm$^3$. Thus, a glass fiber having a single yarn diameter of 2 to 40 µm may be selected. Specifically, when the single yarn diameter of glass fibers is 9 µm, a product RD of 23 is given if glass fibers having a fiber fineness of 660 dtex and a single yarn count of 400 are selected. Or, when the single yarn diameter of glass fibers is 17 µm, a product RD of 43 is given if glass fibers having a fiber fineness of 11,500 dtex and a single yarn count of 2,000 are selected. In a case in which carbon fibers are used as continuous reinforcing fibers, the density of carbon fibers is about 1.8 g/cm$^3$. Thus, a carbon fiber having a single yarn diameter of 2.8 to 55 µm may be selected. Specifically, when the single yarn diameter of carbon fibers is 7 µm, a product RD of 13 is given if carbon fibers having a fiber fineness of 2,000 dtex and a single yarn count of 3,000 are selected. In a case in which aramid fibers are used as continuous reinforcing fibers, the density of aramid fibers is about 1.45 g/cm$^3$. Thus, aramid fibers having a single yarn diameter of 3.4 to 68 µm may be selected. Specifically, when the single yarn diameter of aramid fibers is 12 µm, a product RD of 17 is given if aramid fibers having a fiber fineness of 1,670 dtex and a single yarn count of 1,000 are selected.

Continuous reinforcing fibers, e.g., glass fibers, are manufactured by measuring out and mixing raw material glass, obtaining molten glass by melting the raw material glass in a melting furnace, spinning the molten glass into glass filaments, applying a bundling agent, and winding the filaments by a spinning machine into the form of direct winding roving (DWRs), cakes, twisted yarns, and the like, for example. Continuous reinforcing fibers may take any form, but continuous reinforcing fibers wound into yarns, cakes, and DWRs are preferable because the productivity and the stability of production in the resin coating step are increased. From a viewpoint of the productivity, DWRs are the most preferable.

The form of the continuous reinforcing fiber is not particularly limited, and various forms such as a woven fabric, a knitted fabric, braid string, pipe, a non-crimp fabric, and a unidirectional material can be exemplified. Among them, the form of a woven fabric, a non-crimp fabric, or a unidirectional material is preferably used.

(Thermoplastic Resin)

The thermoplastic resin constituting the continuous fiber reinforced resin composite material of the present embodiment includes preferably two or more thermoplastic resins. By appropriately combining two or more thermoplastic resins, the physical properties (the strength, the rigidity, the high-temperature characteristics, the water absorption characteristics, the impact characteristics, the appearance, and the like) of the continuous fiber reinforced resin composite material can be adjusted.

In addition, the two or more thermoplastic resins are preferably compatible with each other. When two or more thermoplastic resins contained in the continuous fiber reinforced resin composite material are compatible with each other, physical properties (the strength, the rigidity, the high-temperature characteristics, the water absorption characteristics, the impact characteristics, the appearance, and the like) tend to be improved.

The state in which the thermoplastic resins are compatible with each other refers to a state in which, domains are not formed by the plurality of thermoplastic resins in a cross section perpendicular to the length direction of the continuous reinforcing fibers contained in the continuous fiber reinforced resin composite material when the thermoplastic resins are electronically dyed and observed under using a scanning electron microscope (SEM). Specifically, observation can be performed by the method described in Examples to be described below.

The viscosity of the thermoplastic resin is preferably 50 g/10 min or less, and more preferably 40 g/10 min or less in view of the strength, the rigidity, the moldability, and the appearance.

The viscosity of the thermoplastic resin can be determined by an MFR measurement (in accordance with ISO 1133), and specifically can be observed by the method described in Examples to be described below.

The resin having the largest mass ratio among the two or more thermoplastic resins is contained preferably in a mass ratio of 5 times or less, more preferably in a mass ratio of 4 times or less, and even more preferably in a mass ratio of 3 times or less of the resin having the second largest mass ratio, in view of the high-temperature characteristics and the water absorption characteristics. When the mass ratio of the thermoplastic resin is within any of the above ranges, physical properties (the strength, the rigidity, the high-temperature characteristics, the water absorption characteristics, the impact characteristics, the appearance, and the like) tend to be improved.

Examples of the thermoplastic resin include, but are not limited to, polyolefin-based resins such as polyethylene and polypropylene; polyamide-based resin such as polyamide 6, polyamide 66, polyamide 46, polyamide 612, and, polyamide 6I; polyester-based resins such as polyethylene terephthalate, polybutylene terephthalate, and polytrimethylene terephthalate; polyacetal-based resins such as polyoxymethylene; polycarbonate-based resins; polyether-based resins such as polyether ketone, polyether ether ketone, polyether glycol, polypropylene glycol, and polytetramethylene ether glycol; polyether sulfone, polyphenylene sulfide; thermoplastic polyetherimide; thermoplastic fluorine-based resins such as a tetrafluoroethylene-ethylene copolymer; and polyurethane-based resins; acrylic resins; and modified thermoplastic resins produced by modifying these, for example.

Among these thermoplastic resins, polyolefin-based resins, polyamide-based resins, polyester-based resins, polyether-based resins, polyether sulfone, polyphenylene sulfide, thermoplastic polyetherimide, and thermoplastic fluorine-based resins are preferable; polyolefin-based resins, modified polyolefin-based resins, polyamide-based resins, polyester-based resins, polyurethane-based resins, and acrylic resins are more preferable, from the viewpoint of the mechanical properties and versatility; and polyamide-based resins and polyester-based resins are even more preferable when the viewpoint of the thermal properties is added. Furthermore, polyamide-based resins are more preferable from the viewpoint of the durability against repeatedly applied loads.

—Polyester-Based Resin—

The term "polyester-based resin" refers to a polymeric compound having a —CO—O— (ester) bond in the main chain thereof.

Examples of the polyester-based resin include, but are not limited to, polyethylene terephthalate, polybutylene terephthalate, polytetramethylene terephthalate, poly-1,4-cyclohexylenedimethylene terephthalate, and polyethylene-2,6-naphthalene dicarboxylate, for example.

The polyester-based resin may be a homopolyester, or may be a copolymerized polyester.

A preferred copolymerized polyester is a copolymerized polyester obtained through copolymerization of homopolyester with a third component as appropriate. Examples of the third component include, but are not limited to, diol components such as diethylene glycol, neopentyl glycol, and polyalkylene glycol; and dicarboxylic acid components such as adipic acid, sebacic acid, phthalic acid, isophthalic acid, and sodium 5-sulfoisophthalate, for example.

In addition, a polyester-based resin made from a raw material derived from a biomass resource can be used, and examples thereof include aliphatic polyester-based resins such as polylactic acid, polybutylene succinate, and polybutylene succinate adipate, and aromatic polyester-based resins such as polybutylene adipate terephthalate, for example.

—Polyamide-Based Resin—

The term "polyamide-based resin" refers to a polymeric compound having a —CO—NH— (amide) bond in the main chain thereof. Examples thereof include aliphatic polyamide, aromatic polyamide, and wholly aromatic polyamide.

Examples of the polyamide-based resin include, but are not limited to, polyamides obtained through ring-opening polymerization of a lactam, polyamides obtained through self-condensation of an ω-aminocarboxylic acid, and polyamides obtained through condensation of a diamine and a dicarboxylic acid, and copolymers of these, for example.

One of polyamide-based resins may be used alone, or two or more of these may be used as a mixture.

Examples of the lactam include, but are not limited to, pyrrolidone, caprolactam, undecanelactam, and dodecalactam, for example.

Examples of the ω-aminocarboxylic acid include, but are not limited to, an ω-amino fatty acid which is a ring-opening compound of a lactam by water, for example. Each of a lactam or ω-aminocarboxylic acid may be condensed by using two or more types of monomers in combination.

Examples of the diamine (as a monomer) include, but are not limited to, straight chain aliphatic diamines such as hexamethylenediamine and pentamethylenediamine; branched-chain aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine, for example.

Examples of the dicarboxylic acid (as a monomer) include, but are not limited to, aliphatic dicarboxylic acids such as adipic acid, pimelic acid, and sebacic acid; aromatic dicarboxylic acids such as phthalic acid and isophthalic acid; and alicyclic dicarboxylic acids such as cyclohexanedicarboxylic acid, for example. As to each of diamines or dicarboxylic acids as a monomer, one of diamines or dicarboxylic acid may be condensed alone or in combination of two or more of these.

Example of the polyamide-based resin include, but are not limited to, aliphatic polyamides such as polyamide 4 (poly α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, polyamide 612; semi-aromatic polyamides such as polyamide T (polyhexamethylene terephthalamide), polyamide 9T (polynonane methylene terephthalamide), polyamide 6I (polyhexamethylene isophthalamide); and copolymerized polyamides containing these as constituents, for example.

Examples of copolymerized polyamides include, but are not limited to, a copolymer of hexamethylene adipamide and hexamethylene terephthalamide, a copolymer of hexamethylene adipamide and hexamethylene isophthalamide, and a copolymer of hexamethylene terephthalamide and 2-methylpentanediamine terephthalamide, for example.

When a polyamide resin is used, the thermoplastic resin preferably contains 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10.

When the thermoplastic resin contains the aliphatic polyamide (A) and the semi-aromatic polyamide (B) in the above range, physical properties (the strength, the rigidity, the high-temperature characteristics, the water absorption characteristics, the impact characteristics, the appearance, and the like) of the continuous fiber reinforced resin composite material tend to be improved as compared with a case where only (A) an aliphatic polyamide is included as a polyamide.

The sum of the contents of the aliphatic polyamide (A) and the semi-aromatic polyamide (B) is preferably 70 to 100 mass %, more preferably 80 to 100 mass %, and even more preferably 90 to 100 mass %, per 100 mass % of the thermoplastic resin.

The weight average molecular weight (Mw) of the thermoplastic resin containing the aliphatic polyamide (A) and the semi-aromatic polyamide (B) is preferably 15000 to 35000, more preferably 17000 to 35000, even more preferably 20000 to 35000, still more preferably 22000 to 34000, particularly preferably 24000 to 33000, and most preferably 25000 to 32000. When the weight average molecular weight (Mw) of the thermoplastic resin is within the any of above ranges, the strength and the rigidity tend to be improved.

In the thermoplastic resin, the weight average molecular weight $Mw_A$ of the aliphatic polyamide (A) is preferably 1.5 times or more, more preferably twice or more, of the weight average molecular weight $Mw_B$ of the semi-aromatic polyamide (B). When $Mw_A$ is 1.5 times or more of $Mw_B$, the strength and the rigidity tend to be improved.

Note that the weight average molecular weights (Mw) of the thermoplastic resin, the aliphatic polyamide (A), and the semi-aromatic polyamide (B) can be measured by gel permeation chromatography (GPC), and specifically can be observed by the method described in Examples to be described below.

Examples of the aliphatic polyamide (A) include, but are not limited to, polyamide 4, polyamide 6, polyamide 11, polyamide 12, polyamide 46, polyamide 66, polyamide 610, and polyamide 612.

The content of the aliphatic polyamide (A) in 100 mass % of polyamides in the thermoplastic resin is preferably 50 to 99 mass %, more preferably 60 to 90 mass %, and even more preferably 70 to 80 mass %.

Examples of the semi-aromatic polyamide (B) include, but are not limited to, polyamide 6I, polyamide 9I, and polyamide 10I.

The sum of the amounts of the isophthalic acid unit and the diamine unit having a carbon number of 4 to 10 is preferably from 80 to 100 mol %, more preferably from 90 to 100 mol %, and even more preferably from 95 to 100 mol %, with respect to 100 mol % of all constituent units constituting the semi-aromatic polyamide resin (B).

The proportion of the monomer units constituting the semi-aromatic polyamide (B) can be measured by, for example, 13C nuclear magnetic resonance spectroscopy (NMR).

The proportion of the isophthalic acid unit in the dicarboxylic acid unit in the semi-aromatic polyamide (B) is at least 75 mol %, preferably 85 mol % or more, and more preferably 90 mol % or more. When the proportion of the isophthalic acid unit in the dicarboxylic acid unit is within any of the above ranges, the high-temperature characteristics and the water absorption characteristics tend to be improved.

The proportion of the diamine unit having a carbon number of 4 to 10 in the diamine unit in the semi-aromatic polyamide (B) is at least 50 mol %, preferably 60 mol % or more, and more preferably 70 mol % or more. When the proportion of the diamine unit having a carbon number of 4 to 10 in the diamine unit is within any of the above ranges, the high-temperature characteristics and the water absorption characteristics tend to be improved.

The content of the semi-aromatic polyamide (B) in 100 mass % of polyamides in the thermoplastic resin is preferably 1 to 50 mass %, more preferably 10 to 40 mass %, and even more preferably 20 to 30 mass %.

The end groups of in the aliphatic polyamide (A) and the semi-aromatic polyamide (B) may be capped by a known end-capping agent, and the sum of the end capped amounts of the aliphatic polyamide (A) and the semi-aromatic polyamide (B) of which end groups are capped by a known end-capping agent, expressed as an equivalent to 1 g of polyamides of the aliphatic polyamide (A) and the semi-aromatic polyamide (B) in total, is preferably 5 to 180 µeq/g, more preferably 10 to 170 µeq/g, even more preferably 20 to 160 µeq/g, particularly preferably 30 to 140 µeq/g, and most preferably 40 to 140 µeq/g. When the end cupped amount is within any of the above ranges, physical properties (the strength, the rigidity, the high-temperature characteristics, the water absorption characteristics, the impact characteristics, the appearance, and the like) tend to be improved.

Here, the end cupped amount is the total amount of amino ends and carboxyl ends which are capped with a capping agent. The end cupped amount can be measured using $^1$H-NMR, and specifically can be measured by the method described in Examples to be described below.

The end group concentration of the aliphatic polyamide (A) is preferably a half or less, more preferably two-fifth or less, of the end group concentration of the semi-aromatic polyamide (B). When the end group concentration of the aliphatic polyamide (A) is a half or less of the end group concentration of the semi-aromatic polyamide (B), physical properties (the strength, the rigidity, the high-temperature characteristics, the water absorption characteristics, the impact characteristics, the appearance, and the like) tend to be improved.

The end group concentrations of the aliphatic polyamide (A) and the semi-aromatic polyamide (B) can be measured using $^1$H-NMR, and specifically can be measured by the method described in Examples to be described below.

The difference in the peak temperature of tan δ between the aliphatic polyamide (A) and the semi-aromatic polyamide (B) is preferably 45 to 100° C., more preferably 50 to 90° C., and even more preferably 60 to 90° C. When the difference in the peak temperature of tan δ between the aliphatic polyamide (A) and the semi-aromatic polyamide (B) is within any of the above ranges, the high-temperature characteristics and the water absorption characteristics tend to be improved.

The peak temperatures of tan δ of the aliphatic polyamide (A) and the semi-aromatic polyamide (B) can be measured using, for example, a viscoelastic measurement analyzer, and specifically can be measured by the method described in Examples to be described below.

The difference in the viscosity between the aliphatic polyamide (A) and the semi-aromatic polyamide (B) is preferably 3 times or more, and more preferably 4 times or more in view of the strength, the rigidity, the moldability, and the appearance.

The viscosity of a thermoplastic resin can be determined by an MFR measurement (according to ISO 1133), and specifically can be observed by the method described in Examples to be described below.

(Colorant)

The thermoplastic resin may contain a colorant.

Examples of the colorant include carbon black, nigrosine, an aluminum pigment, titanium dioxide, ultramarine blue, cyanine blue, cyanine green, quinacridone, diatomite, monoazo salt, perylene, disazo pigments, condensed azo pigments, isoindoline, red iron oxide, nickel titanium yellow, diketone pyrrolopyrrole, metal salts, perylene red, metal oxides, bismuth vanadate, cobalt green, cobalt blue, anthraquinone, phthalocyanine green, and phthalocyanine blue. Among them, black colorants are preferable, and carbon black and nigrosine are more preferable.

(Applications of Continuous Fiber Reinforced Resin Composite Material)

The continuous fiber reinforced resin composite material of the present embodiment can be suitably used in applications of structural materials, such as aircrafts, automobiles, construction materials, and robots.

In automotive applications, it can be used for, but not limited to, chasses and frames, wheel and suspension parts, drive train parts, interior parts, exterior parts, and functional parts, for example.

Specifically, the continuous fiber reinforced resin composite material can be suitably used as parts including: steering shafts, mounts, sunroofs, steps, roof trims, door trims, trunks, boot lids, bonnets, seat frames, seat backs, retractors, retractor mount brackets, clutches, gears, pulleys, cams, AGs, elastic beams, baffling, lamps, reflectors, glazing, front end modules, back door inners, brake pedals, steering wheels, electric members, sound absorbing materials, door exterior and interior panels, instrument panels, rear gates, ceiling beams, seats, seat frames, wiper arms, electric power steering (EPS) components, micro motors, heat sinks, boxes for engine control unit (ECU) boxes, ECU housings, housing for steering gearboxes, plastic housing, housings for electric vehicle (EV) motors, wire harnesses, in-vehicle meters, combination switches, micro motors, springs, dampers, wheels, wheel covers, frames, sub frames, side frames, frames for motorcycles, fuel tanks, oil pans, intake manifolds, propeller shafts, drive motors, monocock parts, hydrogen tanks, electrodes for fuel cells, panels, floor panels, skin panels, doors, cabins, roofs, hoods, valves, exhaust gas recirculation (EGR) valves, variable valve timing units, connecting rods, cylinder bores, members (engine mounting, front floor cloths, footwell cloths, seat cloths, inner sides, rear cloths, suspensions, pillar reinforcements, front sides, front panels, uppers, dash panel cloths, steering), tunnels, fastening inserts, crush boxes, crush rails, corrugates, roof rails, upper bodies, side rails, braiding, door surrounding assemblies, members for airbags, body pillars, dash to pillar gusset plates, suspension towers, bumpers, body pillar lowers, front body pillars, reinforcements (instrument panels, rails, roofs, front body pillars, roof rails, roof side rails, lockers, door belt lines, front floor under, front body pillar upper, front body pillar lower, center pillars, center pillar hinges, door outside panels), side outer panels, front door window frames, minimum intrusion cabin system (MICS) bulks, torque boxes, radiator supports, radiator fans, water pumps, fuel pumps, electronically controlled throttle bodies, engine control ECUs, starters, alternators, manifolds, transmissions, clutches, dash panels, dash panel insulator pads, door side impact protection beams, bumper beams, door beams, bulk heads, outer pads, inner pads, rear seat rods, door panels, door trim board sub-assembly, energy absorbers (bumpers and shock absorbers), shock absorbing bodies, shock absorbing garnishes, pillar garnishes, roof side inner garnishes, resin ribs, side rail front spacers, side rail rear spacers, seat belt pretensioners, airbag sensors, arms (suspensions, lower, hood hinges), suspension links, shock absorbing brackets, fender brackets, inverter brackets, inverter modules, hood inner panels, hood panels, cowl louvers, cowl top outer front panels, cowl top outer panels, floor silencers, damp sheets, hood insulators, fender side panel protectors, cowl insulators, cowl top ventilator louvers, cylinder head covers, tire deflectors, fender supports, strut tower bars, mission center tunnels, floor tunnels, radiator core supports, luggage panels, luggage floors, accelerator pedals, and accelerator pedal bases.

[Molding of Composite Material]

The continuous fiber reinforced resin composite material of this embodiment can be further molded. Examples of the molding method include a method in which a continuous fiber reinforced resin composite material of this embodiment is cut into a piece in a predetermined size, and is heat compression pressed by a press molding machine while being heated with an infrared heater.

[Continuous Fiber Reinforced Resin Molded Article]

A continuous fiber reinforced resin molded article of the present embodiment is a continuous fiber reinforced resin molded article containing continuous reinforcing fibers and a thermoplastic resin, wherein a peak temperature of tan δ at an interface between the continuous reinforcing fibers and the thermoplastic resin in the continuous fiber reinforced resin molded article is 80° C. or higher, and an interfacial strength of the continuous fiber reinforced resin molded article according to a push-out test is 1.58 to 5.00 mN/μm, and the continuous fiber reinforced resin molded article has a plate shape, a frame shape, a box shape, or a combination thereof.

The continuous reinforcing fibers included in the continuous fiber reinforced resin molded article of the present embodiment may be similar to the continuous reinforcing fibers included in the continuous fiber reinforced resin composite material described above.

Further, the thermoplastic resin contained in the continuous fiber reinforced resin molded article of the present embodiment may be similar to the thermoplastic resin contained in the continuous fiber reinforced resin composite material described above.

In the continuous fiber reinforced resin molded article of the present embodiment, the peak temperature of tan δ, which is defined similarly to the peak temperature of tan δ of the continuous fiber reinforced resin composite material described above, is 80° C. or higher, preferably 85° C. or higher, more preferably 90° C. or higher, and even more preferably 100° C. or higher. When the peak temperature of tan δ is within any of the above ranges, the strength, the rigidity, the water absorption characteristics, the impact characteristics, and the high-temperature characteristics tend to be improved.

As a method of adjusting the peak temperature of tan δ of the continuous fiber reinforced resin molded article so as to fall within any of the above ranges, for example, a method in which the static wettability is adjusted by adjusting the aromatic ring concentration is exemplified, and as the contact angle according to a static wettability test is reduced by increasing the aromatic ring concentration in the resin, the peak temperature of tan δ tends to increase.

The peak temperature of tan δ of the continuous fiber reinforced resin molded article can be determined by, for example, by performing a nanoindentation (nanoDMA) on a single yarn of the continuous reinforcing fibers contained in the continuous fiber reinforced resin molded article in a cross section perpendicular to the length direction of the continuous reinforcing fibers by vibrating at a particular frequency using a nanoindenter, and specifically can be measured by the method described in Examples to be described below.

The interfacial strength of the continuous fiber reinforced resin molded article of the present embodiment (the interfacial strength between the matrix resin and the reinforcing fibers in the continuous fiber reinforced resin molded article)

is 1.58 mN/μm or more, preferably 1.65 mN/μm or more, more preferably 1.75 mN/μm or more, and even more preferably 1.85 mN/μm or more. The interfacial strength is 5.00 mN/μm or less, preferably 4.50 mN/μm or less, and more preferably 3.50 mN/μm or less. When the interfacial strength is within any of the above ranges, the strength, the rigidity, the water absorption characteristics, the impact characteristics, and the high-temperature characteristics tend to be improved.

The interfacial strength of the continuous fiber reinforced resin molded article can be determined, for example, by performing a push-out test using a nanoindenter on a single yarn of the continuous reinforcing fibers in a cross section perpendicular to the length direction of the continuous reinforcing fibers contained in the continuous fiber reinforced resin molded article, and specifically can be measured by the method described in Examples to be described below.

As a method of adjusting the interfacial strength according to a push-out test of the continuous fiber reinforced resin molded article so as to fall within any of the above ranges, for example, a method of adjusting the dynamic wettability and the static wettability between the thermoplastic resin and the continuous reinforcing fibers is exemplified, and as the dynamic wettability is reduced and the contact angle according to a static wettability test is reduced, the interfacial strength tends to increase.

The continuous fiber reinforced resin molded article of the present embodiment has a plate shape, a frame shape, a box shape, or a combination thereof in an external view.

The plate shape is not particularly limited, and examples thereof include those having a polygonal shape such as a quadrangular, pentagonal, or hexagonal shape, a circular shape, a semicircular shape, an elliptical shape, or the like in plan view. The plate shape may be a bent strip shape, for example, an L-shape, a V-shape, an angled U-shape, a U-shape, or the like. In the case of a bent strip shape, the shape of the cross section in the thickness direction is not particularly limited, and may be, for example, a polygonal shape such as a quadrangular, pentagonal, or hexagonal shape, a circular shape, a semicircular shape, an elliptical shape, or the like.

The corners and bent portions of the polygon may be rounded. In addition, a flat plate portion and/or a bent portion may be provided locally.

The frame shape refers to a shape configured to surround hollow space at a central portion in plan view. The shape configured to surround the hollow space may be completely closed or partially discontinued. The outer peripheral shape and the inner peripheral shape in plan view are not particularly limited, and examples thereof include a polygonal shape such as a quadrangular, pentagonal, or hexagonal shape, a circular shape, a semicircular shape, and an elliptical shape, and the outer peripheral shape and the inner peripheral shape may have the same shape (have similar shapes or the like) or may have different shapes.

The corners of the polygonal shape may be rounded. In addition, a flat plate portion and/or a bent portion may be provided locally.

The box shape is not particularly limited, and examples include those with a polygonal shape such as a quadrangular, pentagonal, or hexagonal shape, a circular shape, a semicircular shape, an elliptical shape, or the like in plan view. Also, one surface may be open. Each surface may have the same shape or may have different shapes.

The corners of the polygonal shape may be rounded. In addition, a flat plate portion and/or a bent portion may be provided locally.

It is suffice that the continuous fiber reinforced resin molded article of the present embodiment has an overall shape of a plate shape, a frame shape, a box shape, or a combination thereof in an external view. Hence, any of the shapes may have irregularities including a rib, a boss, etc., a groove, a through-hole, and the like on each surface, and the shape may have not only linear edges but may also have a curve, cutting, or the like.

[Production of Continuous Fiber Reinforced Resin Molded Article]

Examples of the molding method of the continuous fiber reinforced resin molded article of this embodiment include a method in which a continuous fiber reinforced resin composite material containing continuous reinforcing fibers and a thermoplastic resin is cut into a piece in a predetermined size, and is heat compression pressed by a press molding machine while being heated with an infrared heater.

(Applications of continuous Fiber Reinforced Resin Molded Article)

The continuous fiber reinforced resin molded article of the present embodiment can be suitably used in applications of structural materials, such as aircrafts, automobiles, construction materials, and robots.

In automotive applications, it can be used for, but not limited to, chasses and frames, wheel and suspension parts, drive train parts, interior parts, exterior parts, and functional parts, for example. Specifically, applications similar to those of the continuous fiber reinforced resin composite material are exemplified.

EXAMPLES

Hereinafter, the present disclosure will be specifically described with reference to examples and comparative examples. The present disclosure, however, is not limited to these examples, and it is needless to say that the present disclosure can be practices in a wide variety of modifications without departing from the scope of the gist of the present disclosure.

First, procedures and methods for measurements and the like used in Examples and Comparative Examples will be described.

[Weight Average Molecular Weight]

The weight average molecular weight (Mw) of a thermoplastic resin contained in a continuous fiber reinforced resin composite material was measured by GPC (gel permeation chromatography, HLC-8020; Tosoh Corporation) using hexafluoroisopropanol solvent and standard samples for polymethyl methacrylate-converted molecular weights (Polymer Laboratories, Inc.). GPC columns used were TSK-GEL, GMHHR-M, and G1000HHR columns.

In cases where (A) an aliphatic polyamide and (B) a semi-aromatic polyamide were contained in the thermoplastic resin, the weight average molecular weight $Mw_A$ of the aliphatic polyamide (A) and the weight average molecular weight $Mw_B$ of the semi-aromatic polyamide (B) were measured, and the ratio ($Mw_A/Mw_B$) thereof was determined.

[Dynamic Wettability]

The dynamic wettability was measured using a solder wettability tester (Rehsca) by immersing a single yarn of continuous reinforced fibers in a thermoplastic resin heated to a temperature higher than the melting point by 20° C. at an immersion rate of 1.0 mm/sec to an immersion depth of 0.5 mm, and measuring the time duration (wetting time) from the time when the load was maximized having a negative maximum value until the time when the load returned to zero. A shorter time is evaluated to be a better dynamic wettability.

When the continuous fiber reinforced resin composite material contains two or more thermoplastic resins, the maximum value (sec) of the difference in the dynamic wettability with each of the thermoplastic resins was also determined.

[Static Wettability]

A film of a thermoplastic resin and a single yarn of reinforcing fibers were sandwiched between cover glass, and the temperature was raised to 280° C. at 100° C./min on a hot plate. The sample was allowed to stand for 5 minutes, and the temperature was then lowered at 50° C./min. When the sample was cooled to room temperature, the sample was observed under an optical microscope and the angle (contact angle) (°) between the surface of the reinforcing fiber and the thermoplastic resin was measured. A smaller value of this angle was evaluated to be a better static wettability.

[Capped End Amount]

The capped end amount (μeq/g) of a polyamide contained in a continuous fiber reinforced resin composite material was determined by a $^1$H-NMR measurement using JEOL-ECZ500 (JEOL Ltd.).

[Peak Temperature of Tan δ]

A specimen was prepared by cutting out a piece with a length of 1 cm, a width of 0.2 cm, and a thickness of 60 μm from each of a continuous fiber reinforced resin composite material and a continuous fiber reinforced resin molded article to expose a cross section perpendicular to the continuous reinforcing fibers, and polishing. Using the cross section of the obtained specimen as a measuring surface, a nanoDMA test was performed using a nanoindenter (TI980, Bruker) on a single yarn of the continuous reinforcing fibers in the cross section at a frequency of 10 Hz and temperatures ranging from 30° C. to 150° C. in steps of 10° C. to determine the peak temperature (° C.) of tan δ at the interface between the continuous reinforcing fiber and the thermoplastic resin.

[Raman Peak]

A cross section in the thickness direction of the continuous fiber reinforced resin composite material (cross section perpendicular to the length direction of the continuous reinforcing fibers) was cut out at arbitrary-selected five locations, embedded in an epoxy resin, and carefully polished so as not to damage the continuous reinforcing fibers.

A mapping image of the cross sections was taken under a laser Raman microscope (inViaQontor confocal Raman microscope; Renishaw plc.), and the types of resins included in the continuous fiber reinforced resin composite material were identified from the obtained image and the spectrum.

In addition, the peak (cm$^{-1}$) of the Raman spectrum of the resin area in the cross section was checked.

[Compatibility of Thermoplastic Resin]

A cross section of a continuous fiber reinforced resin composite material was mapped with a resolution of 1 μm by the method described in [Raman Measurement] above. Further, the cross section of the continuous fiber reinforced resin composite material was polished, immersed in a 5-wt % aqueous solution of 12 tungsto (VI) phosphoric acid n-hydrate for 18 hours to electronically stain the resin, and then observed under a scanning electron microscope (SEM). The evaluation was rated as O (compatible) when domains were not formed by a plurality of thermoplastic resins, whereas the evaluation was rated as x (incompatible) when domains were formed.

[Peak Intensity Ratio of X-Ray Diffraction]

A measurement was made using an X-ray diffractometer (SmartLab, Rigaku Corporation), X-ray source: CuKα, optical system: concentric technique, power: 45 kV×200 mA, detector: D/tex Ultra in the air.

The ratio (I(0,1,0)/I(1,0,0)) of the peak intensity I(0,1,0) of the (0,1,0) plane to the peak intensity I(1,0,0) of the (1,0,0) plane and the presence or absence of the peak of the (1,1,0) plane were determined.

[Interfacial Strength]

A continuous fiber reinforced resin composite material and a continuous fiber reinforced resin molded article were cut out so that a cross section in the thickness direction (a cross section perpendicular to the length direction of the continuous reinforcing fibers) was exposed, and carefully polished so as not to damage the continuous reinforcing fibers to obtain a specimen having a thickness of 60 μm. By using the cross section of the specimen as a measurement surface, the interfacial strength (mN/μm) of the continuous fiber composite material was determined by performing a push-out test using a nanoindenter (TI Premier, Bruker) on a single yarn of the continuous reinforcing fibers in the cross section.

[Carboxyl End Group Concentration of Continuous Fiber Reinforced Resin Composite Material]

The carboxyl end group amount (μmol/g) of a thermoplastic resin contained in a continuous fiber reinforced resin composite material was determined by performing a $^1$H-NMR measurement using JEOL-ECZ500 (JEOL Ltd.).

[Polishing Pressure at which Separation Occurs at Interface and Reinforcing Fiber Diameter]

A continuous fiber reinforced resin composite material was cut by a band saw so that a cross section in the thickness direction of the continuous fiber reinforced resin (a cross section perpendicular to the length direction of the continuous reinforcing fibers) was exposed, and the cut specimen was polished by a polishing machine (small high-precision specimen preparation system IS-POLISHER ISPP-1000 (Ikegami Seiki Co., Ltd.)) while varying the polishing pressure to 0.078 MPa, 0.167 MPa, 0.245 MPa, and 0.382 MPa. Polishing was carried out for 10 minutes with a water resistant paper No. #2000, 5 minutes with a silicon carbide film having a particle size of 9 μm, 5 minutes with an alumina film having a particle size of 5 μm, 5 minutes with an alumina film having a particle size of 3 μm, 5 minutes with an alumina film having a particle size of 1 μm, and 5 minutes with colloidal silica with a particle size of 0.1 μm in which buffing paper foamed polyurethane was used (Vicaloxus 0.1CR). Each polishing was performed while adding water at about 7 mL/min. The polished samples were observed under an SEM (S-4700, Hitachi High-Technologies Corporation), and the pressure at which a gap was formed at the polar interface between the continuous reinforcing fibers and the thermoplastic resin in the cross section cross section perpendicular to the length direction of the continuous reinforcing fibers was determined to be a polishing pressure (MPa) at which a separation occurs at the interface.

Further, in the SEM observations, the diameters of 10 yarns of the continuous reinforcing fibers were measured based on substantially round cross sections of the continuous reinforcing fibers in the cross section perpendicular to the length direction of the continuous reinforcing fibers, and the average thereof was determined to be the reinforcing fiber diameter (μm).

[Reinforcing Fiber Density]

The reinforced fiber density (g/cm$^3$) was determined by burning off a thermoplastic resin in a continuous fiber reinforced resin composite material using an electric furnace, and measuring the remaining continuous reinforced fibers using a specific gravity meter.

[Interfacial Constant]

The interfacial constant of a continuous fiber reinforced resin composite material was determined by the following formula from the carboxyl end group concentration, the polishing pressure at which a separation occurs at the interface, the reinforcing fiber diameter, and the reinforcing fiber density which were determined.

(interfacial constant)=(carboxyl end group concentration [μmol/g]) of continuous fiber reinforced resin composite material×(polishing pressure [MPa]) at which a separation occurs at the interface×(reinforcing fiber diameter [μm])/(reinforcing fiber density [g/cm$^3$])$^2$

[Tensile Stress]

A strip-like specimen having a length of 70 mm, a width of 10 mm, and a thickness of 2 mm was cut out from each continuous fiber reinforced resin composite material. The specimen was chucked to Instron universal testing machine at a distance of 30 mm in the longitudinal direction, and the tensile stress (MPa) was measured at a speed of 5 mm/min in each of environments of 23° C. and an 50% RH and 80° C. and an 50% RH.

The tensile stress retention ratio (%) at 80° C. was determined by the following formula.

Tensile stress retention ratio at 80° C.=(tensile stress at 80° C. and 50% *RH*/tensile stress at 23° C. and 50% *RH*)×100

[Bending Stress and Bending Elastic Modulus]

A strip-like specimen having a length of 100 mm, a width of 10 mm, and a thickness of 2 mm was cut out from each continuous fiber reinforced resin composite material. The bending stress (MPa) and the bending elastic modulus (GPa) were measured by Instron universal testing machine using a three-point bending jig with a span distance of 32 mm at a speed of 1 mm/min in each of environments of 23° C. and an 50% RH and 80° C. and an 50% RH.

The bending stress retention ratio (%) and the bending elastic modulus retention ratio (%) at 80° C. were determined by the following formulae.

Bending stress retention ratio at 80° C.=(bending stress at 80° C. and 50% *RH*/bending stress at 23° C. and 50% *RH*)×100

Bending elastic modulus retention ratio at 80° C.= (bending elastic modulus at 80° C. and 50% *RH*/bending elastic modulus at 23° C. and 50% *RH*)×100

[Water Absorption Characteristics]

A strip-shaped specimen having a length of 100 mm, a width of 10 mm, and a thickness of 2 mm was cut out from a continuous fiber reinforced resin composite material, immersed in a constant temperature water bath at 80° C. for 18 hours, and then allowed to stand for 150 hours or longer in a constant temperature and constant humidity chamber at 80° C. and 57% RH to adjust the humidity until the mass became a constant value to thereby provide a sample when water is absorbed. The tensile stress (MPa), the bending stress (MPa), and the bending elastic modulus (GPa) were measured under an environment of 80° C. and 50% RH by the methods described in [Measurement of Tensile Stress] and [Measurement of Flexural Stress and Bending Elastic Modulus] above.

The tensile stress retention ratio (%), the bending stress retention ratio (%), and the bending elastic modulus retention ratio (%) when water is absorbed were determined by the following formulae.

Tensile stress retention ratio when water is absorbed=(tensile stress when water is absorbed/tensile stress at 23° C. and 50% *RH*)×100

Bending stress retention ratio when water is absorbed=(bending stress when water is absorbed/bending stress at 23° C. and 50% *RH*)×

Bending elastic modulus retention ratio when water is absorbed=(bending elastic modulus when water is absorbed/bending elastic modulus at 23° C. and 50% *RH*)×100

[Impact Strength]

A specimen having a length of 60 mm, a width of 60 mm, and a thickness of 2 mm was cut out from a continuous fiber reinforced resin composite material, and tested with a high-speed impact tester (Shimadzu HYDRO SHOT HITS-P10, Shimadzu Corporation) in accordance with JIS K7211-2; 2006 with a striker diameter of 20 mm φ, a receptacle diameter of 40 mm φ, a test speed of 4.4 m/sec, a test temperature of 23° C., and a sample number of n=5. The displacement was plotted against the test force, and the maximum impact strength (kN) determined from the plot was divided by the thickness of the specimen, and the average (kN/mm) of 5 samples was determined.

[Appearance of Material]

The surface appearance of a continuous fiber reinforced resin composite material was observed, and was evaluated to be O (excellent) when the surface was not rough and the surface was glossy, Δ (good) when the surface was not rough but the surface was not glossy, or x (bad) when the surface was rough.

The materials used in the examples and comparative examples are as follows.

[Continuous Reinforcing Fibers]

(Glass Fibers)

ER1200T-423 (Nippon Electric Glass Co., Ltd.)

(Carbon Fibers)

TORAYCA T300 (TORAY INDUSTRIES, INC.)

[Fiber Cloth]

A glass cloth or carbon fiber cloth was produced by weaving the above glass fibers or carbon fibers as warps and wefts using a repia loom (weave width: 1 m). The produced glass cloth was plain weave, and had a weave density of 6.5/25 mm and a basis weight of 600 g/m$^2$. Moreover, the produced carbon fiber cloth was plain weave, and had a weave density of 6.5/25 mm and a basis weight of 425 g/m$^2$.

[Thermoplastic Resin]

Resin 1: polyamide 66 (LEONA 1300S (Asahi Kasei Corporation)) (weight average molecular weight (Mw): 45000, viscosity: 25 g/10 min, end group concentration: 100 μmol/g, peak temperature of tan δ: 50° C.)

Resin 2: polyamide 6I (weight average molecular weight (Mw): 20000, viscosity: 35 g/10 min, end group concentration: 260 μmol/g, peak temperature of tan δ: 130° C.)

Resin 3: polyamide 6 (weight average molecular weight (Mw): 31000, viscosity: 97 g/10 min, end group concentration: 90 μmol/g, peak temperature of tan δ: 50° C.)

Resin 4: Polypropylene (viscosity: 20 g/10 min)

Resin 5: polyamide 66 (LEONA 1500 (Asahi Kasei Corporation)) (weight average molecular weight (Mw):

70000, viscosity: 2 g/10 min, end group concentration: 70 μmol/g, peak temperature of tan δ: 50° C.)

Resin 6: polyamide 66 (LEONA 1300 (Asahi Kasei Corporation)) (weight average molecular weight (Mw): 45000, viscosity: 25 g/10 min, end group concentration: 100 μmol/g, peak temperature of tan δ: 50° C.)

Resin 7: polyamide 66 (LEONA 1402S (Asahi Kasei Corporation)) (weight average molecular weight (Mw): 45000, viscosity: 25 g/10 min, end group concentration: 100 μmol/g, peak temperature of tan δ: 50° C.)

Resin 8: polyamide 6/12 (Grilon C CF6S (EMS-CHEMIE (Japan) Ltd.) (weight average molecular weight (Mw): 20000, viscosity: 34 g/10 min, end group concentration: 80 μmol/g, peak temperature of tan δ: 50° C.)

The viscosity of the thermoplastic resin, the end group concentration of the polyamide, and the peak temperature of tan δ were determined by the methods to be described later.

Resin 9: polyamide 6T (weight average molecular weight (Mw): 31000, viscosity: 30 g/10 min, end group concentration: 120 μmol/g, peak temperature of tan δ: 125° C.)

Resin 10: polyamide MXD6 (weight average molecular weight (Mw): 29000, viscosity: 28 g/10 min, end group concentration: 160 μmol/g, peak temperature of tan δ: 75° C.)

Resin 11: polyamide 6T/6I (weight average molecular weight (Mw): 27000, viscosity: 27 g/10 min, end group concentration: 160 μmol/g, peak temperature of tan δ: 125° C.)

Resin 12: After 75 parts by weight of a polyetheretherketone resin (Victrex, PEEK90G), 25 parts by weight of a polyetherimide resin (Sabic, UTM1010), 20 parts by weight of cyclic polyarylene sulfide (manufactured according to WO 2020/017287 A), and 5 parts by weight of linear polyarylene sulfide (manufactured according to WO 2020/017287 A) were dry-blended, they were melt-kneaded using a twin screw extruder model TEX30a (screw diameter: 30 mm, L/D=45, the number of kneading sections of 5, co-rotating complete intermeshing screw) manufactured by The Japan Steel Works, Ltd., in which the cylinder temperature was set so that the resin temperature in the outlet of the dice was higher than the melting point of the resin composition by 20° C., at a screw rotation speed of 300 rpm and a discharge amount of 20 kg/hr, and pelletized by a strand cutter. Tg=154° C.

Resin 13: a polyamide 9T (PA9T) resin composition was obtained as follows. A reactor was charged with 790 g of 1,9-nonanediamine, 790 g of 2-methyl-1,8-octanediamine, 1639 g of terephthalic acid (1,9-nonanediamine: 2-methyl-1,8-octanediamine: terephthalic acid=50:50:98 (molar ratio)), 48.8 g of benzoic acid, 3.3 g of sodium hypophosphite, and 1100 g of water, and was replaced with nitrogen. The internal temperature was raised to 200° C. over 2 hours. At this time, the pressure of the reactor was increased to 2 MPa. The steam was then slowly vented for 2 hours and the reaction was allowed to take place while the pressure was kept to 2 MPa. The pressure was then lowered to 1.2 MPa over 30 minutes to obtain a prepolymer. The prepolymer was ground and dried at 120° C. under reduced pressure for 12 hours. The resultant was subjected to solid-state polymerization under the conditions of 230° C. and 13.3 Pa for 10 hours to obtain a PA9T.

After the above PA9T was dried under reduced pressure at 120° C. for 24 hours, 0.3 parts by weight of SUMIRIZER GA-80 (manufactured by Sumitomo Chemical Co., Ltd.) which is a phenolic heat stabilizer and 0.2 parts by weight of LicoWax-OP (manufactured by Clariant Chemicals) per 100 parts by weight of PA9T were dry-blended, and the resulting mixture was melt-kneaded by feeing it from a hopper of a twin screw extruder (screw diameter: 30 mm, L/D=28, cylinder temperature of 300° C., rotation speed of 150 rpm), extruded into strands, and then cut by a pelletizer to obtain a pelletized PA9T resin composition. Tg=136° C.

(Viscosity of Thermoplastic Resin)

The viscosity of a thermoplastic resin was measured using a bench-top melt indexer (L260, TATEYAMA KAGAKU HIGH-TECHNOLOGIES CO., LTD) in accordance with ISO 1133, wherein a polyamide was measured under the conditions of 270° C. and a load of 2.16 kg and a polypropylene was measured under the conditions of 270° C. and a load of 2.16 kg.

(End Group Concentration of Polyamide)

The end group concentration of a polyamide was determined by measuring the amino end group concentration and the carboxyl end group concentration as follows, and summing them.

Measurements of the carboxyl end group concentration and the amino end group concentration: a $^1$H-NMR measurement was performed using JEOL-ECZ500d, and the carboxyl end group concentration and the amino end group concentration were determined from the respective peak areas, molecular weights, and the numbers of protons.

(Peak Temperature of Tan δ of Polyamide)

The peak temperature of tan δ of a polyamide was determined using a specimen having a thickness of 0.1 mm by a nanoindenter (TI Premier, Bruker) under the conditions of a frequency of 10 Hz and a heating rate of 10° C./min.

[Method of Producing Thermoplastic Resin Films]

Thermoplastic resin films were produced by performing molding using a T-die extrusion molding machine (manufactured by SOUKEN CO. LTD.). The thickness of the films was 200 μm.

Example 1

Resin 1 and Resin 2 were dry-blended in a mass ratio of Resin 1:Resin 2=7:3, and thermoplastic resin films 1 were obtained by the above-described method.

Five glass cloths and six thermoplastic resin films 1 were molded by alternately overlapping the glass cloths and the thermoplastic resin films 1 one another so that the thermoplastic resin films 1 were disposed on the surfaces, thereby obtaining a continuous fiber reinforced resin composite material.

A double belt press machine was used as a molding machine. The glass cloths and the thermoplastic resin films 1 overlapped one another as described above were placed in the molding machine. The temperature inside the molding machine was raised to 330° C., and compression-molding was performed at a pressure of 3 MPa and a belt speed of 0.5 m/min.

The thickness of the continuous fiber reinforced resin composite material was 2 mm. In addition, two thermoplastic resins were confirmed by a Raman measurement.

Further, the obtained continuous fiber reinforced resin composite material was cut into a piece with a size of 300 mm×300 mm×2 mm, which was heated to 300° C. with an infrared heater, then placed in a press molding machine, and pressed to obtain a plate-shaped continuous fiber reinforced resin molded article (300 mm×300 mm×2 mm).

Example 2

A continuous fiber reinforced resin composite material and a continuous fiber reinforced resin molded article were obtained in the same manner as in Example 1 except that only Resin 2 was used as the thermoplastic resin.

The thickness of the continuous fiber reinforced resin composite material was 2 mm. In addition, one thermoplastic resin was confirmed by a Raman measurement.

Example 3

A continuous fiber reinforced resin composite material and a continuous fiber reinforced resin molded article were obtained in the same manner as in Example 1 except that Resin 3 and Resin 2 were used as the thermoplastic resin and dry-blended at a mass ratio of Resin 3:Resin 2=7:3.

The thickness of the continuous fiber reinforced resin composite material was 2 mm. In addition, two thermoplastic resins were confirmed by a Raman measurement.

Example 4

A continuous fiber reinforced resin composite material and a continuous fiber reinforced resin molded article were obtained in the same manner as in Example 1 except that Resin 4 and Resin 2 were used as the thermoplastic resin and dry-blended at a mass ratio of Resin 4:Resin 2=7:3.

The thickness of the continuous fiber reinforced resin composite material was 2 mm. In addition, two thermoplastic resins were confirmed by a Raman measurement.

Example 5

A continuous fiber reinforced resin composite material and a continuous fiber reinforced resin molded article were obtained in the same manner as in Example 1 except that Resin 1 and Resin 2 were used as the thermoplastic resin and dry-blended at a mass ratio of Resin 1:Resin 2=95:5.

The thickness of the continuous fiber reinforced resin composite material was 2 mm. In addition, two thermoplastic resins were confirmed by a Raman measurement.

Example 6

A continuous fiber reinforced resin composite material and a continuous fiber reinforced resin molded article were obtained in the same manner as in Example 1 except that Resin 1 and Resin 2 were used as the thermoplastic resin and dry-blended at a mass ratio of Resin 1:Resin 2=88:12.

The thickness of the continuous fiber reinforced resin composite material was 2 mm. In addition, two thermoplastic resins were confirmed by a Raman measurement.

Example 7

A continuous fiber reinforced resin composite material and continuous fiber reinforced resin molded articles were obtained in the same manner as in Example 1 except that glass fibers (GFUD) aligned in one direction were used instead of the glass cloths.

The thickness of the continuous fiber reinforced resin composite material was 2 mm. In addition, two thermoplastic resins were confirmed by a Raman measurement.

Example 8

A continuous fiber reinforced resin composite material and a continuous fiber reinforced resin molded article were obtained in the same manner as in Example 1 except that 2×2 twill woven glass cloths were used as the glass cloths.

The thickness of the continuous fiber reinforced resin composite material was 2 mm. In addition, two thermoplastic resins were confirmed by a Raman measurement.

Example 9

A continuous fiber reinforced resin composite material and a continuous fiber reinforced resin molded article were obtained in the same manner as in Example 1 except that carbon fibers were used as the continuous reinforcing fibers.

The thickness of the continuous fiber reinforced resin composite material was 2 mm. In addition, two thermoplastic resins were confirmed by a Raman measurement.

Example 10

A continuous fiber reinforced resin composite material and a continuous fiber reinforced resin molded article were obtained in the same manner as in Example 1 except that Resin 5 and Resin 2 were used as the thermoplastic resin and dry-blended so that Resin 5:Resin 2=7:3.

The thickness of the continuous fiber reinforced resin composite material was 2 mm. In addition, two thermoplastic resins were confirmed by a Raman measurement.

Example 11

A continuous fiber reinforced resin composite material and a continuous fiber reinforced resin molded article were obtained in the same manner as in Example 1 except that resin 6 and Resin 2 were used as the thermoplastic resin and dry-blended so that Resin 6:Resin 2=7:3.

The thickness of the continuous fiber reinforced resin composite material was 2 mm. In addition, two thermoplastic resins were confirmed by a Raman measurement.

Example 12

A continuous fiber reinforced resin composite material and a continuous fiber reinforced resin molded article were obtained in the same manner as in Example 1 except that Resin 7 and Resin 2 were used as the thermoplastic resin and dry-blended so that Resin 7:Resin 2=7:3.

The thickness of the continuous fiber reinforced resin composite material was 2 mm. In addition, two thermoplastic resins were confirmed by a Raman measurement.

Example 13

A continuous fiber reinforced resin composite material and a continuous fiber reinforced resin molded article were obtained in the same manner as in Example 1 except that only Resin 9 was used as the thermoplastic resin.

The thickness of the continuous fiber reinforced resin composite material was 2 mm. In addition, one thermoplastic resin was confirmed by a Raman measurement.

Example 14

A continuous fiber reinforced resin composite material and a continuous fiber reinforced resin molded article were obtained in the same manner as in Example 1 except that only Resin 10 was used as the thermoplastic resin.

The thickness of the continuous fiber reinforced resin composite material was 2 mm. In addition, one thermoplastic resin was confirmed by a Raman measurement.

Example 15

A continuous fiber reinforced resin composite material and a continuous fiber reinforced resin molded article were obtained in the same manner as in Example 1 except that only Resin 11 was used as the thermoplastic resin.

The thickness of the continuous fiber reinforced resin composite material was 2 mm. In addition, one thermoplastic resin was confirmed by a Raman measurement.

Comparative Example 1

A continuous fiber reinforced resin composite material and a continuous fiber reinforced resin molded article were obtained in the same manner as in Example 1 except that only Resin 1 was used as the thermoplastic resin.

The thickness of the continuous fiber reinforced resin composite material was 2 mm. In addition, one thermoplastic resin was confirmed by a Raman measurement.

Comparative Example 2

A continuous fiber reinforced resin composite material and a continuous fiber reinforced resin molded article were obtained in the same manner as in Example 1 except that Resin 1 and Resin 3 were used as the thermoplastic resin and dry-blended so that Resin 1:Resin 3=7:3.

The thickness of the continuous fiber reinforced resin composite material was 2 mm. In addition, two thermoplastic resins were confirmed by a Raman measurement.

Comparative Example 3

A continuous fiber reinforced resin composite material and a continuous fiber reinforced resin molded article were obtained in the same manner as in Example 1 except that Resin 1 and Resin 4 were used as the thermoplastic resin and dry-blended so that Resin 1:Resin 4=7:3.

The thickness of the continuous fiber reinforced resin composite material was 2 mm. In addition, two thermoplastic resins were confirmed by a Raman measurement.

Comparative Example 4

Tests similar to the tests in Example 1 were carried out using "Tepex dynalite 101" (2 mm in thickness) manufactured by Lanxess K. K., which was produced by impregnating glass cloths with polyamide 66. Further, a continuous fiber reinforced resin molded article was obtained in the same manner as in Example 1.

Comparative Example 5

Tests similar to the tests in Example 1 were carried out using "Tepex dynalite 102" (2 mm in thickness) manufactured by Lanxess K. K., which was produced by impregnating glass cloths with polyamide 6. Further, a continuous fiber reinforced resin molded article was obtained in the same manner as in Example 1.

Comparative Example 6

Tests similar to the tests in Example 1 were carried out using "Tepex dynalite 104" (2 mm in thickness) manufactured by Lanxess K. K., which was produced by impregnating glass cloths with polypropylene. Further, a continuous fiber reinforced resin molded article was obtained in the same manner as in Example 1.

Comparative Example 7

A continuous fiber reinforced resin composite material and a continuous fiber reinforced resin molded article were obtained in the same manner as in Example 1 except that only Resin 3 was used as the thermoplastic resin.

The thickness of the continuous fiber reinforced resin composite material was 2 mm. In addition, one thermoplastic resin was confirmed by a Raman measurement.

Comparative Example 8

A continuous fiber reinforced resin composite material and a continuous fiber reinforced resin molded article were obtained in the same manner as in Example 1 except that Resin 1 and Resin 8 were used as the thermoplastic resin and dry-blended so that Resin 1:Resin 8=7:3.

The thickness of the continuous fiber reinforced resin composite material was 2 mm. In addition, two thermoplastic resins were confirmed by a Raman measurement.

Comparative Example 9

A continuous fiber reinforced resin composite material and a continuous fiber reinforced resin molded article were obtained in the same manner as in Example 1 except that only Resin 4 was used as the thermoplastic resin.

The thickness of the continuous fiber reinforced resin composite material was 2 mm. In addition, one thermoplastic resin was confirmed by a Raman measurement.

Comparative Example 10

Sixteen bobbins around which carbon fiber bundles (TORAY INDUSTRIES, INC., T700S-12K) were wound were prepared, and carbon fiber bundles were continuously fed from the respective bobbin through thread guides. In an impregnation die, the continuously fed carbon fiber bundles (CFUDs) were impregnated with Resin 12 which was fed from a feeder filled with Resin 12 in a certain amount. The carbon fibers impregnated with Resin 12 in the impregnation die were continuously drawn from the nozzle of the impregnation die using a drawing roll at a drawing speed of 1 m/min. The temperature (processing temperature) at which the carbon fibers was drawn was 445° C. The drawn carbon fiber bundles were passed through a cooling roll so as to cool and solidify Resin 12, and wound up on a winding machine as a continuous fiber reinforced resin composite material.

The obtained continuous fiber reinforced resin composite material had a thickness of 0.08 mm and a width of 50 mm, and the reinforcing fibers were aligned in one direction, whereby a continuous fiber reinforced resin composite material having a volume content of 60% was obtained. Further, a continuous fiber reinforced resin molded article (300 mm×50 mm×0.08 mm) was obtained in the same manner as in Example 1.

Comparative Example 11

Continuous fibers (carbon fibers TR50S15L (filament count: 15000) manufactured by Mitsubishi Rayon Co., Ltd.) (CFUDs) which had been opened at 120° C. and spread to a width of 30 cm were drawn at 2 m/min, and Resin 13 melted at 295° C. was uniformly dropped on the continuous fibers so that Resin 13 and the continuous fibers had a weight ratio of about 1:1. The resultant was sandwiched between polyimide films, which was pressed by a roll press under the conditions of 295° C. and 2 MPa and then cooled, whereby a fiber reinforced polyamide sheet having a width of 30 cm and a thickness of 0.21 mm was obtained.

Twelve sheets of the obtained fiber reinforced polyamide sheets were laminated so that the directions of the fibers were 0°, 90°, 0°, 90°, 0°, 90°, 90°, 0°, 90°, 0°, 90°, 0° with respect to one side of a 12-cm square mold (12 cm in length), and set in the mold. The mold was set in a vacuum press, and the mold temperature was raised from 30° C. to 300° C. in 40 minutes under evacuation. After holding at 300° C. for 30 minutes, the evacuation was stopped and the temperature was lowered to 30° C. in 15 minutes under a pressure of 5 MPa to obtain a continuous fiber reinforced resin composite material having a thickness of about 2 mm. Further, a continuous fiber reinforced resin molded article (120 mm×120 mm×2 mm) was obtained in the same manner as in Example 1.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition | | Resin 1 | parts by mass | 70 | | | | 95 | 88 | 70 |
| | | Resin 2 | parts by mass | 30 | 100 | 30 | 30 | 5 | 12 | 30 |
| | | Resin 3 | parts by mass | | | 70 | | | | |
| | | Resin 4 | parts by mass | | | | 70 | | | |
| | | Resin 5 | parts by mass | | | | | | | |
| | | Resin 6 | parts by mass | | | | | | | |
| | | Resin 7 | parts by mass | | | | | | | |
| | | Resin 8 | parts by mass | | | | | | | |
| | | Resin 9 | parts by mass | | | | | | | |
| | | Resin 10 | parts by mass | | | | | | | |
| | | Resin 11 | parts by mass | | | | | | | |
| | | Reinforced fiber substrate | — | GF plain weave | GF plain weave | GF plain weave | GF plain weave | GF plain weave | GF plain weave | GFUD |
| Physical properties | Resin | Difference in peak temperature of tan δ of polyamides | ° C. | 80 | N | 80 | 130 | 80 | 80 | 80 |
| | | Mw of thermoplastic resin | — | 33000 | 20000 | 26000 | 35000 | 42000 | 40000 | 33000 |
| | | Mw ratio ($Mw_A/Mw_B$) of polyamides | — | 2.25 | N | 1.5 | N | 2.25 | 2.25 | 2.25 |
| | | Dynamic wettability (wetting time) | sec | 1.77 | 1.81 | 1.80 | 2.84 | 3.23 | 2.18 | 1.77 |
| | | Static wettability (contact angle) | ° | 20 | 28 | 24 | 40 | 39 | 34 | 20 |
| | | Difference in dynamic wettability between thermoplastic resins | sec | 0.49 | N | 0.40 | 3.4 | 0.49 | 0.49 | 0.49 |
| | | Capped end amount of polyamide | μeq/g | 20 | 40 | 12 | 12 | 11 | 14 | 20 |
| | | Ratio of end group concentration of polyamide | — | 0.35 | N | 0.37 | 0 | 0.35 | 0.35 | 0.35 |
| | Composite material | Peak temperature of tan δ | ° C. | 114 | 129 | 107 | 98 | 80 | 82 | 110 |
| | | Raman peak | $cm^{-1}$ | 1005 | 1005 | 1005 | 1005 | 1005 | 1005 | 1005 |
| | | Compatibility of thermoplastic resins | — | ○ | N | ○ | X | ○ | ○ | ○ |
| | | Ratio of peak intensity of X-ray diffraction (I(0, 1, 0)/I(1, 0, 0)) | — | 0.58 | N | 0.58 | 0.47 | 0.52 | 0.53 | 0.58 |
| | | Presence or absence of a peak in (1, 1, 0) plane in X-ray diffraction | — | Yes | N | Yes | Yes | Yes | Yes | Yes |
| | | Interfacial strength | mN/μm | 1.96 | 1.91 | 1.95 | 1.44 | 1.47 | 1.55 | 1.96 |
| | | Interfacial constant | — | 72 | 68 | 69 | 20 | 30 | 40 | 72 |
| | | Carboxyl end group concentration | μmol/g | 110 | 200 | 110 | 60 | 77 | 85 | 110 |
| | | Polishing pressure at which separation occurs at interface | MPa | 0.25 | 0.13 | 0.24 | 0.13 | 0.15 | 0.18 | 0.25 |
| | | Reinforcing fiber diameter | μm | 17 | 17 | 17 | 17 | 17 | 17 | 17 |
| | | Reinforcing fiber density | $g/cm^3$ | 2.55 | 2.55 | 2.55 | 2.55 | 2.55 | 2.55 | 2.55 |

TABLE 1-continued

|  |  |  | | | | | | | | |
|---|---|---|---|---|---|---|---|---|---|---|
|  |  | Tensile stress | MPa | 603 | 607 | 600 | 510 | 590 | 591 | 1206 |
|  |  | Bending stress | MPa | 868 | 877 | 840 | 620 | 820 | 830 | 1600 |
|  |  | Bending elastic modulus | GPa | 28.4 | 27.5 | 27.8 | 24.0 | 26.0 | 26.5 | 55.0 |
|  |  | Tensile stress retention ratio at 80° C. | % | 96 | 92 | 89 | 81 | 92 | 93 | 96 |
|  |  | Bending stress retention ratio at 80° C. | % | 70 | 72 | 70 | 60 | 60 | 62 | 70 |
|  |  | Bending elastic modulus retention ratio at 80° C. | % | 91 | 86 | 74 | 67 | 81 | 82 | 91 |
|  |  | Tensile stress retention ratio when water is absorbed | % | 98 | 97 | 94 | 96 | 83 | 85 | 98 |
|  |  | Bending stress retention ratio when water is absorbed | % | 92 | 98 | 86 | 93 | 81 | 83 | 92 |
|  |  | Bending elastic modulus retention ratio when water is absorbed | % | 92 | 89 | 86 | 91 | 84 | 85 | 92 |
|  |  | Impact strength | kN/mm | 5.8 | 5.1 | 5.9 | 9.4 | 4.6 | 4.9 | 5.8 |
|  |  | Appearance | — | ○ | ○ | ○ | ○ | Δ | Δ | ○ |
|  | Molded article | Peak temperature of tanδ | ° C. | 114 | 129 | 107 | 98 | 80 | 82 | 110 |
|  |  | Interfacial strength | mN/μm | 1.97 | 1.91 | 1.95 | 1.39 | 1.47 | 1.55 | 1.97 |

|  |  |  | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Composition |  | Resin 1 | 70 | 70 |  |  |  |  |  |  |
|  |  | Resin 2 | 30 | 30 | 30 | 30 | 30 |  |  |  |
|  |  | Resin 3 |  |  |  |  |  |  |  |  |
|  |  | Resin 4 |  |  |  |  |  |  |  |  |
|  |  | Resin 5 |  |  | 70 |  |  |  |  |  |
|  |  | Resin 6 |  |  |  | 70 |  |  |  |  |
|  |  | Resin 7 |  |  |  |  | 70 |  |  |  |
|  |  | Resin 8 |  |  |  |  |  |  |  |  |
|  |  | Resin 9 |  |  |  |  |  | 100 |  |  |
|  |  | Resin 10 |  |  |  |  |  |  | 100 |  |
|  |  | Resin 11 |  |  |  |  |  |  |  | 100 |
|  |  | Reinforced fiber substrate | GF 2 × 2 twill weave | GF plain weave | GF plain weave | GF plain weave | GF plain weave | GF plain weave | GF plain weave | GF plain weave |
| Physical properties | Resin | Difference in peak temperature of tan δ of polyamides | 80 | 80 | 80 | 80 | 80 | N | N | N |
|  |  | Mw of thermoplastic resin | 33000 | 33000 | 50000 | 33000 | 33000 | 31000 | 29000 | 27000 |
|  |  | Mw ratio (Mw$_A$/Mw$_B$) of polyamides | 2.25 | 2.25 | 3.35 | 2.25 | 2.25 | N | N | N |
|  |  | Dynamic wettability (wetting time) | 1.77 | N | 1.94 | 1.77 | 10.0 | 1.83 | 1.92 | 1.85 |
|  |  | Static wettability (contact angle) | 20 | N | 31 | 22 | 80 | 31 | 33 | 29 |
|  |  | Difference in dynamic wettability between thermoplastic resins | 0.49 | 0.49 | 0.67 | 0.53 | 9 | N | N | N |
|  |  | Capped end amount of polyamide | 20 | 20 | 12 | 12 | 12 | 50 | 30 | 40 |
|  |  | Ratio of end group concentration of polyamide | 0.35 | 0.35 | 0.085 | 0.40 | 0.41 | N | N | N |
|  | Composite material | Peak temperature of tan δ | 114 | 109 | 104 | 106 | 108 | 118 | 85 | 125 |
|  |  | Raman peak | 1005 | 1005 | 1005 | 1005 | 1005 | N | N | 1005 |
|  |  | Compatibility of thermoplastic resins | ○ | ○ | ○ | ○ | ○ | N | N | N |
|  |  | Ratio of peak intensity of X-ray diffraction (I(0, 1, 0)/I(1, 0, 0)) | 0.58 | 0.58 | 0.54 | 0.58 | 0.56 | 0.69 | 0.66 | 0.59 |
|  |  | Presence or absence of a peak in (1, 1, 0) plane in X-ray diffraction | Yes | Yes | Yes | Yes | Yes | Yes | Yes | Yes |
|  |  | Interfacial strength | 1.96 | 1.87 | 1.86 | 1.92 | 1.77 | 1.89 | 1.85 | 1.79 |
|  |  | Interfacial constant | 72 | 50 | 54 | 66 | 63 | 61 | 59 | 67 |
|  |  | Carboxyl end group concentration | 110 | 110 | 98 | 110 | 110 | 90 | 110 | 120 |
|  |  | Polishing pressure at which separation occurs at interface | 0.25 | 0.21 | 0.21 | 0.23 | 0.22 | 0.20 | 0.24 | 0.25 |
|  |  | Reinforcing fiber diameter | 17 | 7 | 17 | 17 | 17 | 17 | 17 | 17 |
|  |  | Reinforcing fiber density | 2.55 | 1.8 | 2.55 | 2.55 | 2.55 | 2.55 | 2.55 | 2.55 |

TABLE 1-continued

|  |  |  |  |  |  |  |  |  |  |
|---|---|---|---|---|---|---|---|---|---|
|  | Tensile stress | 606 | 900 | 570 | 594 | 592 | 583 | 567 | 591 |
|  | Bending stress | 865 | 900 | 810 | 845 | 820 | 822 | 809 | 816 |
|  | Bending elastic modulus | 28.0 | 52.0 | 24.5 | 27.0 | 25.7 | 27.5 | 26.2 | 26.8 |
|  | Tensile stress retention ratio at 80° C. | 96 | 90 | 87 | 94 | 90 | 79 | 79 | 83 |
|  | Bending stress retention ratio at 80° C. | 70 | 68 | 61 | 65 | 62 | 72 | 71 | 71 |
|  | Bending elastic modulus retention ratio at 80° C. | 91 | 82 | 81 | 89 | 84 | 87 | 88 | 80 |
|  | Tensile stress retention ratio when water is absorbed | 98 | 91 | 86 | 96 | 87 | 83 | 81 | 82 |
|  | Bending stress retention ratio when water is absorbed | 92 | 88 | 82 | 90 | 85 | 76 | 77 | 90 |
|  | Bending elastic modulus retention ratio when water is absorbed | 92 | 89 | 83 | 90 | 84 | 84 | 82 | 86 |
|  | Impact strength | 5.8 | 2.1 | 5.2 | 5.6 | 5.5 | 5.1 | 5.0 | 5.2 |
|  | Appearance | ○ | ○ | Δ | ○ | Δ | ○ | ○ | Δ |
| Molded article | Peak temperature of tanδ | 114 | 109 | 104 | 106 | 108 | 118 | 85 | 125 |
|  | Interfacial strength | 1.96 | 1.86 | 1.86 | 1.92 | 1.77 | 1.89 | 1.85 | 1.79 |

|  |  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Composition |  | Resin 1 | parts by mass | 100 | 70 |  | 70 |  |  |
|  |  | Resin 2 | parts by mass |  |  |  |  |  |  |
|  |  | Resin 3 | parts by mass |  |  | 30 |  |  |  |
|  |  | Resin 4 | parts by mass |  |  |  | 30 |  |  |
|  |  | Resin 5 | parts by mass |  |  |  |  |  |  |
|  |  | Resin 6 | parts by mass |  |  |  |  |  |  |
|  |  | Resin 7 | parts by mass |  |  |  |  |  |  |
|  |  | Resin 8 | parts by mass |  |  |  |  |  |  |
|  |  | Resin 12 | parts by mass |  |  |  |  |  |  |
|  |  | Resin 13 | parts by mass |  |  |  |  |  |  |
|  |  | Reinforced fiber substrate | — | — | GF plain weave | GF plain weave | GF plain weave | GF 2 × 2 twill weave | GF 2 × 2 twill weave | GF 2 × 2 twill weave |
| Physical properties | Resin | Difference in peak temperature of tan δ of polyamides | ° C. | N | 0 | 50 | N | N | N |
|  |  | Mw of thermoplastic resin | — | 45000 | 40000 | 45000 | N | N | N |
|  |  | Mw ratio (Mw$_A$/Mw$_B$) of polyamides | — | N | 1.50 | 1.00 | N | N | N |
|  |  | Dynamic wettability (wetting time) | sec | 1.32 | 1.48 | 1.64 | N | N | N |
|  |  | Static wettability (contact angle) | ° | 38 | 39 | 51 | N | N | N |
|  |  | Difference in dynamic wettability between thermoplastic resins | sec | N | 0.09 | 3.89 | N | N | N |
|  |  | Capped end amount of polyamide | μeq/g | 10 | 7 | 7 | 0 | 0 | N |
|  |  | Ratio of end group concentration of polyamide | — | N | 0.82 | N | N | N | N |
|  | Composite material | Peak temperature of tan δ | ° C. | 37 | 34 | 28 | 35 | 32 | 0 |
|  |  | Raman peak | cm$^{-1}$ | N | N | N | N | N | N |
|  |  | Compatibility of thermoplastic resins | — | N | X | X | N | N | N |
|  |  | Ratio of peak intensity of X-ray diffraction (I(0, 1, 0)/I(1, 0, 0)) | — | 2.9 | 3.1 | 3.6 | 4.0 | 4.2 | 4.8 |
|  |  | Presence or absence of a peak in (1, 1, 0) plane in X-ray diffraction | — | None | None | None | None | None | None |

TABLE 1-continued

|  |  |  |  |  |  |  |  |  |
|---|---|---|---|---|---|---|---|---|
|  | Interfacial strength | mN/μm | 0.81 | 1.41 | 0.75 | 1.38 | 1.38 | 0.52 |
|  | Interfacial constant | — | 31 | 27 | 14 | 13 | 13 | N |
|  | Carboxyl end group concentration | μmol/g | 70 | 70 | 50 | 60 | 60 | N |
|  | Polishing pressure at which separation occurs at interface | MPa | 0.17 | 0.15 | 0.11 | 0.08 | 0.08 | 0.05 |
|  | Reinforcing fiber diameter | μm | 17 | 17 | 17 | 17 | 17 | 17 |
|  | Reinforcing fiber density | g/cm³ | 2.55 | 2.55 | 2.55 | 2.55 | 2.55 | 2.55 |
|  | Tensile stress | MPa | 560 | 565 | 450 | 407 | 423 | 360 |
|  | Bending stress | MPa | 810 | 790 | 520 | 602 | 670 | 390 |
|  | Bending elastic modulus | GPa | 25.0 | 25.3 | 23.1 | 21.0 | 21.0 | 17.0 |
|  | Tensile stress retention ratio at 80° C. | % | 91 | 87 | 76 | 70 | 70 | 60 |
|  | Bending stress retention ratio at 80° C. | % | 58 | 58 | 55 | 51 | 51 | 46 |
|  | Bending elastic modulus retention ratio at 80° C. | % | 78 | 74 | 70 | 68 | 68 | 65 |
|  | Tensile stress retention ratio when water is absorbed | % | 78 | 68 | 79 | 68 | 63 | 79 |
|  | Bending stress retention ratio when water is absorbed | % | 78 | 72 | 76 | 75 | 69 | 78 |
|  | Bending elastic modulus retention ratio when water is absorbed | % | 79 | 71 | 78 | 70 | 67 | 79 |
|  | Impact strength | kN/mm | 4.3 | 4.4 | 7.1 | 2.6 | 2.9 | 6.0 |
|  | Appearance | — | X | X | X | X | X | X |
| Molded article | Peak temperature of tan δ | ° C. | 37 | 34 | 28 | 35 | 32 | 0 |
|  | Interfacial strength | mN/μm | 0.81 | 1.41 | 0.75 | 1.38 | 1.38 | 0.52 |

|  |  |  | Comp. Ex. 7 | Comp. Ex. 8 | Comp. Ex. 9 | Comp. Ex. 10 | Comp. Ex. 11 |
|---|---|---|---|---|---|---|---|
| Composition |  | Resin 1 |  |  | 70 |  |  |
|  |  | Resin 2 |  |  |  |  |  |
|  |  | Resin 3 | 100 |  |  |  |  |
|  |  | Resin 4 |  |  |  | 100 |  |
|  |  | Resin 5 |  |  |  |  |  |
|  |  | Resin 6 |  |  |  |  |  |
|  |  | Resin 7 |  |  |  |  |  |
|  |  | Resin 8 |  | 30 |  |  |  |
|  |  | Resin 12 |  |  |  | 100 |  |
|  |  | Resin 13 |  |  |  |  | 100 |
|  |  | Reinforced fiber substrate | GF plain weave | GF plain weave | GF plain weave | CFUD | CFUD |
| Physical properties | Resin | Difference in peak temperature of tan δ of polyamides | N | 0 | N | 50 | N |
|  |  | Mw of thermoplastic resin | 30000 | 39000 | 45000 | 1500 | 12000 |
|  |  | Mw ratio (Mw$_A$/Mw$_B$) of polyamides | N | 2.25 | N | 1.1 | N |
|  |  | Dynamic wettability (wetting time) | 1.41 | 3.45 | 4.7 | 6.2 | 8.8 |
|  |  | Static wettability (contact angle) | 41 | 60 | 65 | 68 | 71 |
|  |  | Difference in dynamic wettability between thermoplastic resins | N | 5.5 | N | 5.2 | N |
|  |  | Capped end amount of polyamide | N | 7 | N | N | 20 |
|  |  | Ratio of end group concentration of polyamide | N | 0.7 | N | N | N |
|  | Composite material | Peak temperature of tan δ | 34 | 31 | 0 | 70 | 65 |
|  |  | Raman peak | N | N | N | N | N |
|  |  | Compatibility of thermoplastic resins | N | X | N | N | N |
|  |  | Ratio of peak intensity of X-ray diffraction (I(0, 1, 0)/I(1, 0, 0)) | 3.3 | 8.3 | 8.3 | 6.3 | 8.4 |
|  |  | Presence or absence of a peak in (1, 1, 0) plane in X-ray diffraction | None | None | None | None | None |
|  |  | Interfacial strength | 0.80 | 0.77 | 0.53 | 0.31 | 0.24 |
|  |  | Interfacial constant | 26 | 16 | N | 11 | 13 |
|  |  | Carboxyl end group concentration | 70 | 70 | N | 100 | 40 |

TABLE 1-continued

|  |  |  |  |  |  |  |
|---|---|---|---|---|---|---|
|  | Polishing pressure at which separation occurs at interface | 0.14 | 0.09 | 0.08 | 0.09 | 0.04 |
|  | Reinforcing fiber diameter | 17 | 17 | 17 | 9 | 9 |
|  | Reinforcing fiber density | 2.55 | 2.55 | 2.55 | 1.8 | 1.8 |
|  | Tensile stress | 561 | 510 | 390 | 402 | 390 |
|  | Bending stress | 742 | 530 | 410 | 390 | 420 |
|  | Bending elastic modulus | 25.0 | 22.4 | 18.0 | 24.1 | 24.2 |
|  | Tensile stress retention ratio at 80° C. | 84 | 72 | 65 | 58 | 61 |
|  | Bending stress retention ratio at 80° C. | 59 | 51 | 48 | 54 | 48 |
|  | Bending elastic modulus retention ratio at 80° C. | 85 | 65 | 50 | 69 | 64 |
|  | Tensile stress retention ratio when water is absorbed | 72 | 58 | 90 | 66 | 53 |
|  | Bending stress retention ratio when water is absorbed | 64 | 61 | 79 | 42 | 58 |
|  | Bending elastic modulus retention ratio when water is absorbed | 71 | 60 | 90 | 62 | 59 |
|  | Impact strength | 4.8 | 2.1 | 8.0 | 1.8 | 1.7 |
|  | Appearance | X | X | X | X | X |
| Molded article | Peak temperature of tan δ | 34 | 31 | 0 | 70 | 65 |
|  | Interfacial strength | 0.8 | 0.77 | 0.53 | 0.31 | 0.24 |

N: Not measured

As summarized in Table 1 above, the continuous fiber reinforced resin composite materials of Examples 1 to 15 had quite high tensile stress, bending stress, bending elastic modulus, impact strength, and physical properties when water was absorbed and at high temperatures because the peak temperatures of tan δ at the interface between the continuous reinforcing fibers and the thermoplastic resin were 80° C. or higher. In addition, because the continuous fiber reinforced resin composite materials of Examples 1 to 12 and 15 contained isophthalic acid units, they were excellent in characteristics when water was absorbed and at high temperatures, which is important in practical use. On the other hand, in Comparative Examples 1 to 11, because the aromatic ring concentration or the static wettability between and the continuous reinforcing fibers and the thermoplastic resin were insufficient, the peak temperatures of tan δ at the interface were lower than the peak temperatures of tan δ of the resin per se. Further, because the peak temperatures of tan δ were less than 80° C., the tensile stress, the bending stress, the bending elastic modulus, the impact strength, and the physical properties when water was absorbed and high temperatures were lowered.

INDUSTRIAL APPLICABILITY

The continuous fiber reinforced resin composite material of the present embodiment is industrially applicable as reinforcing members for materials for which mechanical properties are required at higher levels, such as structural components of a wide variety of machines and automobiles, and as composite materials containing thermoplastic resin compositions for shaped articles.

The invention claimed is:

1. A continuous fiber reinforced resin composite material comprising continuous reinforcing fibers and a thermoplastic resin, wherein
   the thermoplastic resin comprises 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10, and
   a peak temperature of tan δ at an interface between the continuous reinforcing fibers and the thermoplastic resin in the continuous fiber reinforced resin composite material is 80° C. or higher.

2. The continuous fiber reinforced resin composite material according to claim 1, wherein an interfacial strength of the continuous fiber reinforced resin composite material according to a push-out test is 1.58 to 5.00 mN/μm.

3. The continuous fiber reinforced resin composite material according to claim 1, wherein an interfacial constant of the continuous fiber reinforced resin composite material expressed by the following formula is 20 to 100:
   (the interfacial constant)=(a carboxyl end group concentration [μmol/g]) of the continuous fiber reinforced resin composite material×(a polishing pressure [MPa]) at which a separation occurs at the interface× (a reinforcing fiber diameter [μm])/(a reinforcing fiber density [g/cm$^3$])$^2$.

4. The continuous fiber reinforced resin composite material according to claim 1, wherein the continuous fiber reinforced resin composite material has a Raman peak at 950 to 1050 cm$^{-1}$.

5. The continuous fiber reinforced resin composite material according to claim 1, wherein a peak intensity of a (1,0,0) plane by X-ray diffraction of the continuous fiber reinforced resin composite material is higher than a peak intensity of a (0,1,0) plane.

6. The continuous fiber reinforced resin composite material according to claim 1, wherein a peak of the (1,1,0) plane is detected in X-ray diffraction of the continuous fiber reinforced resin composite material.

7. The continuous fiber reinforced resin composite material according to claim 1, wherein
   the continuous reinforcing fiber is a woven fabric, a unidirectional material, or a non-crimped fabric of glass fibers, and
a weight average molecular weight (Mw) of the thermoplastic resin is 15000 to 35000.

8. The continuous fiber reinforced resin composite material according to claim 1, wherein a capped end amount which is expressed as an equivalent to 1 g of the aliphatic polyamide (A) and the semi-aromatic polyamide (B) is 5 to 180 µeq/g.

9. A continuous fiber reinforced resin molded article comprising continuous reinforcing fibers and a thermoplastic resin, wherein
the thermoplastic resin comprises 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10, and
a peak temperature of tan $\delta$ at an interface between the continuous reinforcing fibers and the thermoplastic resin in the continuous fiber reinforced resin molded article is 80° C. or higher, and an interfacial strength of the continuous fiber reinforced resin molded article according to a push-out test is 1.58 to 5.00 mN/µm, and the continuous fiber reinforced resin molded article has a plate shape, a frame shape, a box shape, or a combination thereof.

10. A method of producing a continuous fiber reinforced resin composite material according to claim 1, comprising compositing continuous reinforcing fibers and a thermoplastic resin, wherein
a dynamic wettability between the continuous reinforcing fibers and the thermoplastic resin is 3.0 sec or less.

11. The method of producing a continuous fiber reinforced resin composite material according to claim 10, wherein a contact angle between the continuous reinforcing fibers and the thermoplastic resin according to a static wettability test is 38° or less.

12. The method of producing a continuous fiber reinforced resin composite material according to claim 10, wherein the thermoplastic resin comprises two or more thermoplastic resins, and a maximum value of a difference in the dynamic wettability between each of the two or more thermoplastic resins and the continuous reinforcing fibers is 3 sec or more.

13. The method of producing a continuous fiber reinforced resin composite material according to claim 10, wherein
the thermoplastic resin comprises 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10, and
an end group concentration of the aliphatic polyamide (A) is a half or less of an end group concentration of the semi-aromatic polyamide (B).

14. The method of producing a continuous fiber reinforced resin composite material according to claim 13, wherein a difference in the peak temperature of tan & between the aliphatic polyamide (A) and the semi-aromatic polyamide (B) is 45 to 100° C.

15. The method of producing a continuous fiber reinforced resin composite material according to claim 13, wherein a weight average molecular weight $Mw_A$ of the aliphatic polyamide (A) is 1.5 times or more of a weight average molecular weight $Mw_B$ of the semi-aromatic polyamide (B).

16. The method of producing a continuous fiber reinforced resin composite material according to claim 13, wherein the content of the semi-aromatic polyamide (B) in 100 mass % of polyamides in the thermoplastic resin is 20 to 50 mass %.

17. The method of producing a continuous fiber reinforced resin composite material according to claim 16, wherein
the continuous reinforcing fibers are glass fibers, and a bundling agent is applied to the glass fibers, and
the bundling agent includes a silane coupling agent, a lubricant, and a binding agent, and the amount of the bundling agent to be applied, as the total mass of the silane coupling agent, the lubricant, and the binding agent, is 0.1 to 3 mass %.

18. The method of producing a continuous fiber reinforced resin composite material according to claim 17, wherein the binding agent includes a polyamide-based resin.

19. The method of producing a continuous fiber reinforced resin composite material according to claim 17, wherein the lubricant includes a fatty acid amide.

* * * * *